(12) United States Patent
Furlong

(10) Patent No.: US 11,241,051 B2
(45) Date of Patent: *Feb. 8, 2022

(54) AMBIDEXTROUS FISH SCALE-TEXTURED GLOVE

(71) Applicant: Covco (H.K.) Limited, Wanchai (HK)

(72) Inventor: John Joseph Furlong, Bangkok (TH)

(73) Assignee: Covco (H.K.) Limited, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,649

(22) Filed: Dec. 6, 2017

(65) Prior Publication Data

US 2018/0092414 A1    Apr. 5, 2018

Related U.S. Application Data

(63) Continuation of application No. 15/631,342, filed on Jun. 23, 2017, now abandoned, which is a continuation of application No. 14/325,578, filed on Jul. 8, 2014, now Pat. No. 9,730,477.

(51) Int. Cl.
| | |
|---|---|
| *A41D 19/00* | (2006.01) |
| *A41D 19/04* | (2006.01) |
| *B29C 41/14* | (2006.01) |
| *B29L 31/48* | (2006.01) |

(52) U.S. Cl.
CPC ......... *A41D 19/0003* (2013.01); *A41D 19/04* (2013.01); *B29C 41/14* (2013.01); *A41D 19/0058* (2013.01); *B29L 2031/4864* (2013.01)

(58) Field of Classification Search
CPC .. A41D 19/003; A41D 19/04; A41D 19/0058; B29L 2031/4864
See application file for complete search history.

(56) References Cited

U.S. PATENT DOCUMENTS

| | | | |
|---|---|---|---|
| 1,206,102 A | 11/1916 | Gibson | |
| 3,411,982 A | 11/1968 | Kavalir et al. | |
| 3,600,716 A * | 8/1971 | Berry | A41D 19/0062 2/167 |
| 3,883,899 A | 5/1975 | Ganz | |

(Continued)

FOREIGN PATENT DOCUMENTS

| | | |
|---|---|---|
| CN | 1812730 A | 8/2006 |
| CN | 101098637 A | 1/2008 |

(Continued)

OTHER PUBLICATIONS

Australian Examination Report received in related AU 356099 dated Nov. 3, 2014.

(Continued)

*Primary Examiner* — Shaun R Hurley
*Assistant Examiner* — Bao-Thieu L Nguyen
(74) *Attorney, Agent, or Firm* — Fredrikson & Byron, P.A.

(57) ABSTRACT

The described invention relates to an ambidextrous working glove having fish scale-textured inner and outer surfaces and methods of making same. The textured outer surfaces include a series of protruding ridges surrounded by depressions. The textured inner surfaces are the reverse of the textured outer surfaces and include a series of islands surrounded by channels. The textured outer surfaces and textured inner surfaces provide advantageous grip properties.

10 Claims, 18 Drawing Sheets

(56) References Cited

U.S. PATENT DOCUMENTS

| | | | | |
|---|---|---|---|---|
| 4,084,265 A * | 4/1978 | Anfelt | | A41D 19/0072 |
| | | | | 2/163 |
| 4,329,312 A | 5/1982 | Ganz | | |
| 4,441,213 A | 4/1984 | Trumble et al. | | |
| 5,421,033 A * | 6/1995 | DeLeo | | A41D 19/0062 |
| | | | | 2/161.7 |
| 5,500,956 A * | 3/1996 | Schulkin | | A63B 71/148 |
| | | | | 2/159 |
| 5,676,092 A * | 10/1997 | Ortolivo | | A01K 13/001 |
| | | | | 119/650 |
| 5,794,266 A * | 8/1998 | Han | | A41D 19/0062 |
| | | | | 2/159 |
| 6,081,928 A | 7/2000 | Bourne | | |
| 6,099,936 A * | 8/2000 | Kashihara | | A41D 19/01558 |
| | | | | 2/159 |
| 6,254,947 B1 * | 7/2001 | Schaller | | A41D 19/0058 |
| | | | | 2/161.7 |
| 6,451,893 B1 | 9/2002 | Tao | | |
| 6,790,933 B2 | 9/2004 | Huynh et al. | | |
| D519,684 S * | 4/2006 | Simic | | D29/118 |
| 7,234,170 B2 * | 6/2007 | Simic | | A41D 19/0058 |
| | | | | 2/16 |
| 7,356,852 B2 | 4/2008 | Thai | | |
| D602,207 S * | 10/2009 | Hull | | D29/117.1 |
| 7,691,436 B2 * | 4/2010 | Neuser | | A41D 19/0058 |
| | | | | 427/181 |
| 7,718,240 B2 * | 5/2010 | Neuser | | A61K 31/716 |
| | | | | 428/35.7 |
| 7,802,314 B2 * | 9/2010 | Cohen | | A41D 19/0006 |
| | | | | 2/161.1 |
| 8,028,348 B2 * | 10/2011 | Hull | | A41D 19/0058 |
| | | | | 2/159 |
| 8,075,965 B2 * | 12/2011 | Neuser | | A61K 31/716 |
| | | | | 106/162.1 |
| 8,286,264 B2 * | 10/2012 | Hull | | A41D 19/0058 |
| | | | | 2/159 |
| 8,302,216 B2 * | 11/2012 | Hull | | A41D 19/0058 |
| | | | | 2/159 |
| 8,458,818 B2 * | 6/2013 | Neuser | | A61K 31/716 |
| | | | | 2/168 |
| 8,495,764 B2 | 7/2013 | Hull | | |
| 8,889,787 B2 * | 11/2014 | Nagahama | | C08G 18/664 |
| | | | | 128/844 |
| 8,980,373 B2 * | 3/2015 | Nethsinghe | | B29D 99/0067 |
| | | | | 2/159 |
| D735,968 S * | 8/2015 | Furlong | | D2/617 |
| D745,999 S * | 12/2015 | Sood | | D29/117.2 |
| 9,730,477 B2 * | 8/2017 | Furlong | | A41D 19/0003 |
| 2003/0118837 A1 | 6/2003 | Modha et al. | | |
| 2003/0124354 A1 | 7/2003 | Vistins | | |
| 2004/0036196 A1 | 2/2004 | Conley | | |
| 2005/0037054 A1 * | 2/2005 | Hamann | | A41D 19/0058 |
| | | | | 424/443 |
| 2005/0177923 A1 | 8/2005 | Simic | | |
| 2006/0041991 A1 | 3/2006 | Kim | | |
| 2006/0048270 A1 * | 3/2006 | Chen | | A41D 19/0062 |
| | | | | 2/167 |
| 2006/0115653 A1 | 6/2006 | Soerens et al. | | |
| 2006/0140994 A1 | 6/2006 | Bagwell et al. | | |
| 2009/0007313 A1 * | 1/2009 | Boorsma | | A41D 19/01505 |
| | | | | 2/161.8 |
| 2009/0139011 A1 * | 6/2009 | VanErmen | | A41D 19/01505 |
| | | | | 2/161.8 |
| 2010/0017940 A1 * | 1/2010 | Sha | | A41D 19/0065 |
| | | | | 2/161.8 |
| 2011/0191936 A1 | 8/2011 | Lipinski et al. | | |
| 2012/0000005 A1 * | 1/2012 | Kishihara | | A41D 19/0096 |
| | | | | 2/168 |
| 2012/0005807 A1 * | 1/2012 | Hull | | A41D 19/0058 |
| | | | | 2/163 |
| 2012/0036612 A1 * | 2/2012 | Hull | | A41D 19/0003 |
| | | | | 2/163 |
| 2013/0091618 A1 * | 4/2013 | Tanaka | | A41D 19/01558 |
| | | | | 2/161.8 |
| 2013/0219588 A1 * | 8/2013 | Nakagawa | | A41D 19/0065 |
| | | | | 2/168 |
| 2013/0305430 A1 * | 11/2013 | Tomono | | A41D 19/01558 |
| | | | | 2/163 |
| 2014/0041096 A1 * | 2/2014 | Takahashi | | A41D 19/01558 |
| | | | | 2/168 |
| 2014/0115751 A1 * | 5/2014 | Saito | | A41D 19/0082 |
| | | | | 2/168 |
| 2015/0143609 A1 * | 5/2015 | Francisco Costa | | A41D 19/01547 |
| | | | | 2/167 |
| 2015/0164160 A1 * | 6/2015 | Furlong | | A41D 19/0003 |
| | | | | 2/169 |
| 2015/0257464 A1 * | 9/2015 | Furlong | | A41D 19/0003 |
| | | | | 2/161.8 |
| 2015/0272241 A1 * | 10/2015 | Lucas | | C08L 11/00 |
| | | | | 2/167 |
| 2016/0183611 A1 * | 6/2016 | Dangalla | | A41D 19/0058 |
| | | | | 2/168 |
| 2016/0192721 A1 * | 7/2016 | Kishihara | | A41D 19/01558 |
| | | | | 2/159 |

FOREIGN PATENT DOCUMENTS

| | | |
|---|---|---|
| CN | 102131475 A | 7/2011 |
| EP | 824896 A1 | 2/1998 |
| EP | 1260549 A1 | 11/2002 |
| EP | 1435374 A2 | 7/2004 |
| EP | 925329 B1 | 3/2005 |
| EP | 1965719 A2 | 9/2008 |
| EP | 1638423 B1 | 9/2011 |
| EP | 2381100 A2 | 10/2011 |
| GB | 2100580 A | 1/1983 |
| JP | H05186902 A | 7/1993 |
| JP | 2005514228 A | 5/2005 |
| JP | 2012523505 A | 10/2012 |
| KR | 1020120041281 A | 5/2012 |
| WO | 9748765 A1 | 12/1997 |
| WO | 03057444 A1 | 7/2003 |
| WO | 2005002375 A1 | 1/2005 |
| WO | 2005110749 A1 | 11/2005 |
| WO | 2007058880 A2 | 5/2007 |
| WO | 2007105122 A1 | 9/2007 |
| WO | 2010023634 A2 | 3/2010 |

OTHER PUBLICATIONS

Combined Search and Examination Report under Sections 17 and 18(3) received in related GB1415814.1 dated Oct. 1, 2014.
EP Pat. App. No. 13899233.4, Extended European Search Report dated Jul. 20, 2017, 7 pages.
International Patent Application No. PCT/US2013/074919, International Search Report and Written Opinion dated Aug. 27, 2015, 9 pages.

* cited by examiner

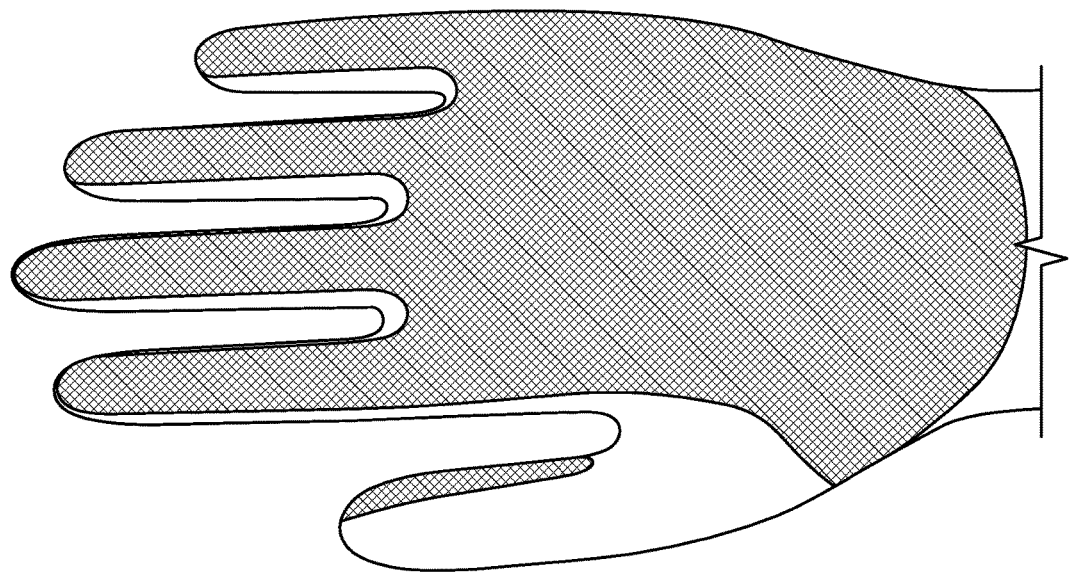
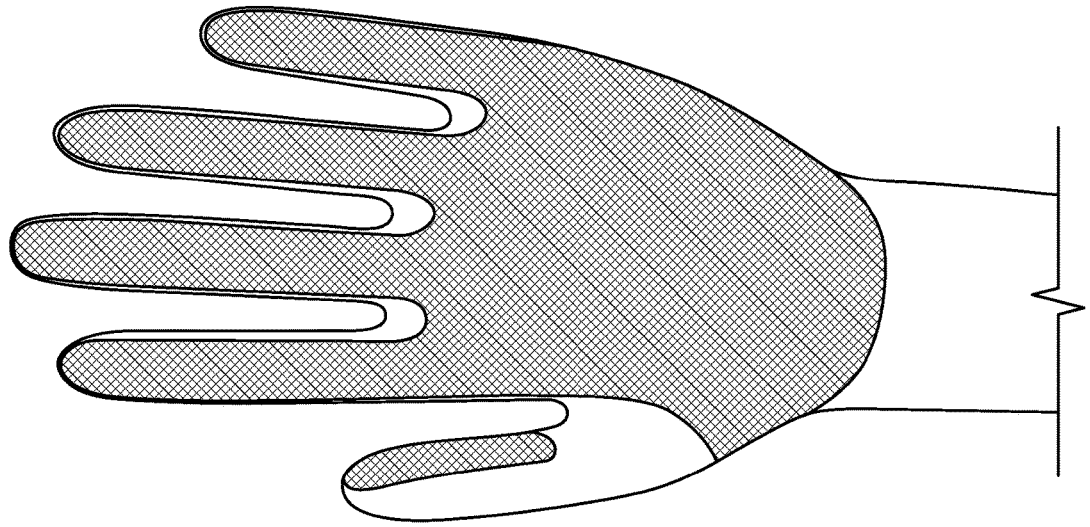
Figure 2

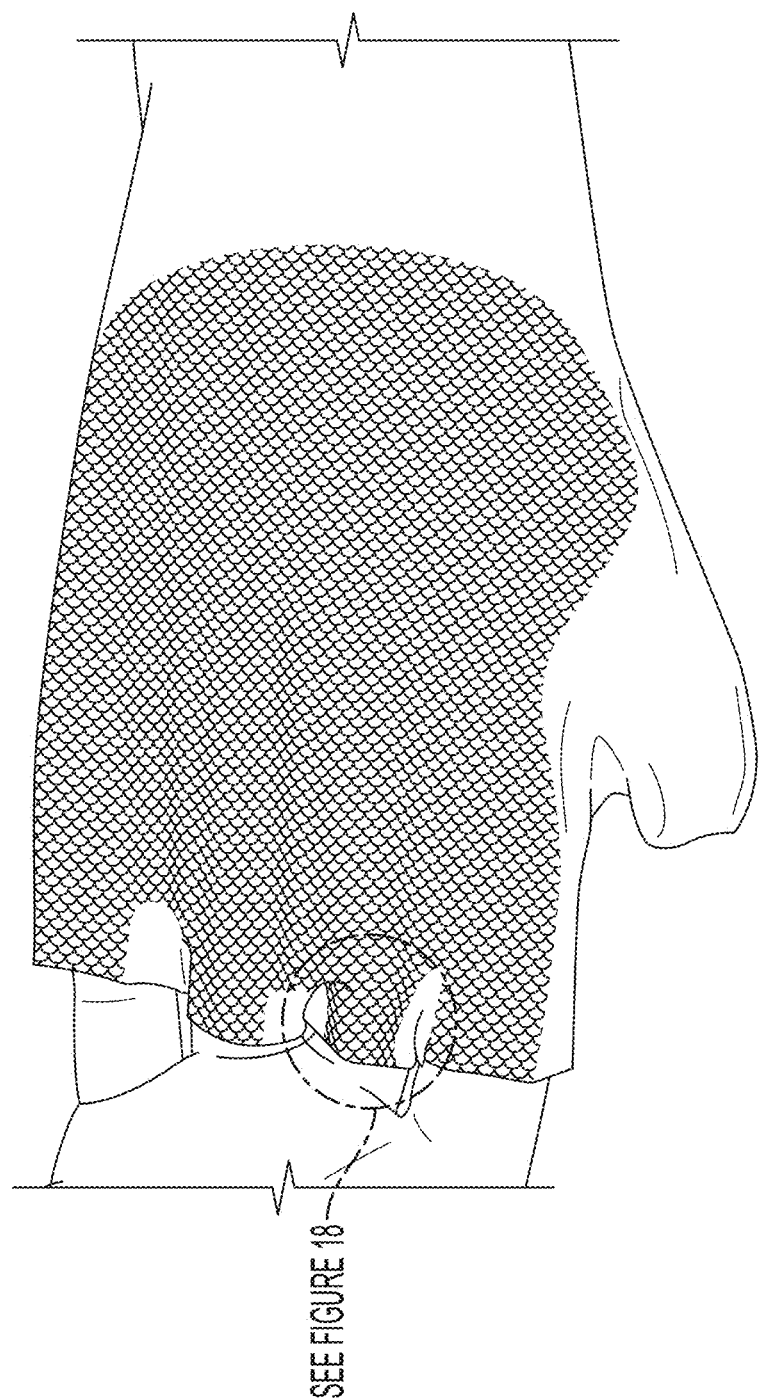

AMBIDEXTROUS FISH SCALE-TEXTURED GLOVE

This application is a continuation of commonly owned, co-pending U.S. patent application Ser. No. 15/631,342, titled "AMBIDEXTROUS FISH SCALE-TEXTURED GLOVE," having a filing date of Jun. 23, 2017, which is a continuation of commonly owned, U.S. patent application Ser. No. 14/325,578, titled "AMBIDEXTROUS FISH SCALE-TEXTURED GLOVE," having a filing date of Jul. 8, 2014, and which matured into U.S. Pat. No. 9,730,477, having an issue date of Aug. 15, 2017, the contents of each of which are incorporated by reference herein in their entirety.

FIELD OF THE INVENTION

This application is a continuation of The described invention relates to an ambidextrous working glove having fish scale-textured inner and outer surfaces and methods of making same.

BACKGROUND

Typical uses of working gloves include food processing, chemical handling, pesticide spraying, and the like. The thickness of working gloves should not hamper tactile sensation. However, the working gloves should be strong enough to resist rupture. It is desirable in working gloves to provide roughened or textured inner and outer surfaces, since working gloves with smooth surfaces make gripping items difficult for a wearer. A textured outer surface enables a wearer to adequately grip items that may be slippery. In addition, the inner surface of the glove is in close contact with the wearer's skin and does not absorb the wearer's perspiration. A textured inner surface may reduce the likelihood of slippage of the wearer's hand inside the working glove during use that may be caused by perspiration, wherein the textured inner surface may enable the perspiration to flow away from any pressured surface without "skating" of the glove over the surface of the wearer's hand.

Current attempts to form a glove with textured inner and outer surfaces have employed methods whereby a texture is imparted to the inner surface by using a textured form, and either treating the film forming the glove in a manner that erodes the film thereby creating texture on the outer surface, or by spraying particles onto the outer surface of the glove. Such methods are unsatisfactory, due to various factors, such as, for example, lack of dexterity, difficulty in donning, non-uniform thickness of the glove causing the glove to rupture during use.

Current working gloves frequently utilize donning powders, such as, for example, cornstarch or talc, to enable a wearer to don the glove more easily. However, donning powders can contaminate wounds, irritate skin, leave a residue on equipment and clothing, and mechanically interfere with some procedures that a user may perform while wearing the working glove.

Previous attempts to ameliorate the slippage of the glove caused by the wearer's perspiration have proved unsuccessful. For example, cotton flock linings frequently are only able to absorb small amount of perspiration before losing their effectiveness.

Additionally, present methods to impart a contact-reducing texture to the inner surface of the glove to ameliorate the effects of the wearer's perspiration and/or aid donning frequently reduce mechanical performance of the glove, leading to rupture of the glove.

Accordingly, there remains a need for a working glove with textured inner and outer surfaces, with improved dexterity, ease of donning and a reduced frequency of failure during use.

SUMMARY

The present invention provides an ambidextrous working glove having fish scale-textured inner and outer surfaces and methods of making same.

In one embodiment, the present invention provides a method for making an ambidextrous working glove having fish scale-textured inner and outer surfaces comprising the steps of:

a. providing a first polymer solution;
b. providing a coagulant solution;
c. providing a second polymer solution;
d. providing at least one former having a fish scale-textured surface and dipping the at least one former into the coagulant solution to coat the at least one former with coagulant;
e. removing the at least one former from the coagulant solution and drying the coagulant coating on the at least one former;
f. dipping the at least one former coated with coagulant into the first polymer solution, and allowing the first polymer solution to coat the at least one former;
g. removing the at least one former from the first polymer solution and drying the polymer coating on the at least one former, forming a film;
h. washing the film on the at least one former, and dipping the film coated at least one former into a second polymer solution, and allowing the second polymer solution to coat the film; and
i. stripping the glove from the at least one former.

In one embodiment, the ambidextrous working glove of the present invention complies with at least one requirement selected from the group consisting of Federal Food, Drug, and Cosmetic Act ("FFDCA") requirements for food handling, European Standard EN374-3, European Standard EN388:2003, European Standard EN374-2, European Standard EN420:2003, European Standard EN1186:2002, and European Standard EN421:2010.

In one embodiment, the ambidextrous working glove of the present invention complies with FFDCA requirements for food handling.

In one embodiment, the ambidextrous working glove of the present invention complies with European Standard EN374-3.

In one embodiment, the ambidextrous working glove of the present invention complies with European Standard EN388:2003.

In one embodiment, the ambidextrous working glove of the present invention complies with European Standard EN374-2.

In one embodiment, the ambidextrous working glove of the present invention complies with European Standard EN420:2003.

In one embodiment, the ambidextrous working glove of the present invention complies with European Standard EN1186:2002.

In one embodiment, the ambidextrous working glove of the present invention complies with European Standard EN421:2010.

In one embodiment, the at least one former has a fish scale-textured surface that imparts a fish scale-texture to the ambidextrous working glove of the present invention. In one embodiment, the fish scale-textured surface of the at least one former imparts a fish scale-texture to the inner and outer surfaces of the ambidextrous working glove of the present invention.

In one embodiment, first polymer solution is a synthetic rubber copolymer solution. The synthetic rubber copolymer solution may be a solution comprising a copolymer of acetonitrile and butadiene.

In one embodiment, first polymer solution is a latex solution.

In one embodiment, second polymer solution is a solution that allows the ambidextrous working glove of the present invention to slide over a wearer's hand while the glove is being donned. In one embodiment, the second polymer solution is a polyurethane solution.

In one embodiment, the present invention provides an ambidextrous working glove having fish scale-textured inner and outer surfaces.

In one embodiment, the present invention provides at least one former for making an ambidextrous an ambidextrous working glove having fish scale-textured inner and outer surfaces wherein:
a. the surface of the at least one former is textured on the front and back of the region of the at least one former that forms the fingers of the ambidextrous working glove;
b. the surface of the at least one former is textured on the region of the at least one former that forms the palm of the ambidextrous working glove;
c. the surface of the at least one former is textured on the region of the at least one former that forms the back of the ambidextrous working glove; and
d. the surface of the at least one former is textured on the region of the at least one former that forms the region of the thumb that faces the palm of the ambidextrous working glove.

BRIEF DESCRIPTION OF THE DRAWINGS

FIG. 2 shows an at least one former that is utilized to form one embodiment of the ambidextrous working glove of the present invention.

FIG. 11 shows the inner surface of one embodiment of the ambidextrous working glove of the present invention.

FIG. 11 shows the inner surface of one embodiment of the ambidextrous working glove of the present invention.

DETAILED DESCRIPTION

Figure 1:
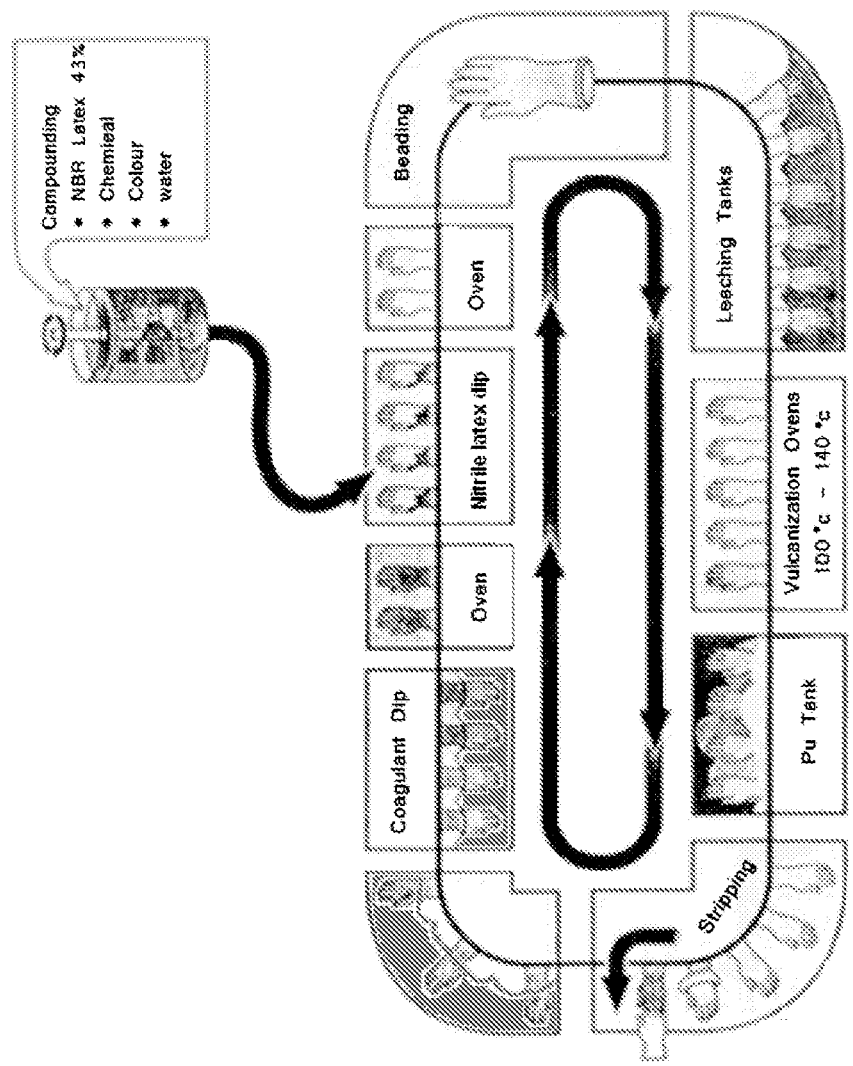
FIG. 1 depicts one method by which one embodiment of the ambidextrous working glove of the present invention may be formed.

In one embodiment, the ambidextrous working glove of the present invention is formed on at least one former, which may be suitably mounted on a desired carrier, such as a movable board or a conveyor chain, The at least one former is carried sequentially through a series of steps as illustrated schematically in FIG. 1. In forming the ambidextrous working glove of the present invention, it is preferable to dip the at least one former into a bath of suitable coagulant material. The coagulant may control the thickness of the film of the first polymer solution that forms on the at least one former, that forms the ambidextrous working glove of the present invention. Alternatively, the coagulant may assist in the later removal of the ambidextrous working glove of the present invention from the at least one former. Alternatively, the coagulant solution may control the thickness of the film of the first polymer solution and may assist in the later removal of the ambidextrous working glove of the present invention from the at least one former. The at least one former is dipped into a slip dip bath of a first polymer solution to form a film on the at least one former. The film coated at least one former is passed through an oven to solidify the film. The solid film coated at least one former is then washed or leached to remove any contaminants, then the washed solid film coated at least one former is then dipped into a second polymer solution that coats the solid film coated at least one former. A bead is formed on the coated film on the at least one former, and the finished glove is then stripped from the at least one former.

In certain embodiments, the coated film may be treated before the finished glove is stripped from the at least one former. The treatment may be vulcanization. Alternatively, the coated film may be treated with at least one additional chemical. Examples of the at least one additional chemical may include antimicrobial agents, such as the antimicrobial coating disclosed in EP 1965719 A2.

Referring to FIG. 1, an ambidextrous working glove having fish scale-textured inner and outer surfaces is made via a method comprising the steps of:
a. providing a first polymer solution;
b. providing a coagulant solution;
c. providing a second polymer solution;
d. providing at least one former having a fish scale-textured surface and dipping the at least one former into the coagulant solution to coat the at least one former with coagulant;
e. removing the at least one former from the coagulant solution and drying the coagulant coating on the at least one former;
f. dipping the at least one former coated with coagulant into the first polymer solution, and allowing the first polymer solution to coat the at least one former;
g. removing the at least one former from the first polymer solution and drying the polymer coating on the at least one former, forming a film;
h. washing the film on the at least one former, and dipping the film coated at least one former into a second polymer solution, and allowing the second polymer solution to coat the film; and
i. stripping the glove from the at least one former.

In one embodiment, the finished gloves may then be further processed. Such further processing may include, for example, packaging, sterilization, and the like.

In one embodiment, prior to removal of the finished glove from the at least one former, the finished glove may be treated with at least one additional chemical. Examples of the at least one additional chemical may include antimicrobial agents, such as the antimicrobial coating disclosed in EP 1965719 A2. The inner surface of the finished glove may be treated with at least one additional chemical. Alternatively, the outer surface of the finished glove may be treated with at least one additional chemical. Alternatively, both the inner and outer surface of the finished glove may be treated with at least one additional chemical.

The first polymer solution may be any polymer suitable for forming a working glove that complies with at least one requirement selected from the group consisting of FFDCA requirements for food handling, European Standard EN374-3, European Standard EN388:2003, European Standard EN374-2, European Standard EN420:2003, European Standard EN1186:2002, and European Standard EN421:2010.

The first polymer solution may be any polymer suitable for forming a working glove that complies with European Standard EN374-3 for chemical resistance. Alternatively, the first polymer solution may be any polymer suitable for forming a working glove that complies with FFDCA requirements for food handling. Alternatively, the first polymer solution may be any polymer suitable for forming a working glove that complies with European Standard EN388:2003 for protective gloves against mechanical risks. Alternatively, the first polymer solution may be any polymer suitable for forming a working glove that complies with European Standard EN374-2. Alternatively, the first polymer solution may be any polymer suitable for forming a working glove that complies with European Standard EN420:2003. Alternatively, the first polymer solution may be any polymer suitable for forming a working glove that complies with European Standard EN1186:2002. Alternatively, the first polymer solution may be any polymer suitable for forming a working glove that complies with European Standard EN421:2010.

In one embodiment, the first polymer solution is latex. In an alternate embodiment, the first polymer solution is a synthetic rubber copolymer solution. The synthetic rubber copolymer may be a solution comprising a copolymer of acetonitrile and butadiene.

In one embodiment, the first polymer solution is a solution comprising a mixture of nitrile latex, sulphur, zinc oxide, titanium dioxide, zinc dibutyldithiocarbamate (ZDBC), ammonia, vultamol and potassium hydroxide.

In one embodiment, the solution the first polymer solution is a solution comprising a mixture of nitrile latex, sulphur, zinc oxide, titanium dioxide, ZDBC, ammonia, vultamol and potassium hydroxide is formed according to the mixture set forth in Table 1 below.

TABLE 1

| Chemical | Parts per hundred of rubber |
| --- | --- |
| Nitrile latex (43% v/v, initial concentration) | 100 |
| Sulphur powder | 1.34 |
| Zinc oxide | 1.74 |
| Titanium dioxide | 1.88 |
| ZDBC | 1.05 |
| Ammonia (12% v/v initial concentration) | 3.60 |
| Vultamol | 0.23 |
| Potassium hydroxide | 0.87 |

In one embodiment, the first polymer solution is the solution comprising the copolymer of acetonitrile and butadiene disclosed in WO2007105122 A1.

In one embodiment, the first polymer solution is the solution comprising the copolymer of acetonitrile and butadiene disclosed in EP1435374 A2.

In one embodiment, the first polymer solution is the solution comprising the copolymer of acetonitrile and butadiene disclosed in EP1260549 A1.

In one embodiment, the first polymer solution is the solution comprising the copolymer of acetonitrile and butadiene disclosed in EP0925329 B1.

The first polymer solution may contain additional additives, such as, for example, colorants, preservatives, fragrances, and the like.

The coagulant solution may be a calcium nitrate solution. In one embodiment the coagulant solution is a 35% w/v solution of calcium nitrate. Alternatively, the coagulant solution may be the coagulant solution disclosed in EP1638423 B1.

In one embodiment, the at least one former has a fish scale-textured surface that imparts a fish scale-texture to the ambidextrous working glove of the present invention. In one embodiment, the fish scale-textured surface of the at least one former imparts a fish scale-texture to the inner and outer surfaces of the ambidextrous working glove of the present invention. One of ordinary skill in the art can readily appreciate that not all surface textures on the at least one former are capable of imparting a surface texture to both the inner and outer surface of an ambidextrous working glove of the present invention.

In one embodiment, the measured thickness of the glove in a textured area is greater than the measured thickness of the glove measured in a non-textured area. The thickness of the glove may be measured by any suitable method, such as, for example, via the use of a micrometer.

In one embodiment, the textured surface measured thickness of the glove in a textured area is 10% greater than the measured thickness of the glove measured in a non-textured area. In an alternate embodiment, the measured thickness of the glove in a textured area is 15% greater than the measured thickness of the glove measured in a non-textured area. In an alternate embodiment, the measured thickness of the glove in a textured area is 20% greater than the measured thickness of the glove measured in a non-textured area. In an alternate embodiment, the measured thickness of the glove in a textured area is 25% greater than the measured thickness of the glove measured in a non-textured area. In an alternate embodiment, the measured thickness of the glove in a textured area is 30% greater than the measured thickness of the glove measured in a non-textured area. In an alternate embodiment, the measured thickness of the glove in a textured area is 35% greater than the measured thickness of the glove measured in a non-textured area. In an alternate embodiment, the measured thickness of the glove in a textured area is 40% greater than the measured thickness of the glove measured in a non-textured area. In an alternate embodiment, the measured thickness of the glove in a textured area is 45% greater than the measured thickness of the glove measured in a non-textured area. In an alternate embodiment, the measured thickness of the glove in a textured area is 50% greater than the measured thickness of the glove measured in a non-textured area.

In one embodiment, the textured inner and outer surfaces of the ambidextrous working glove of the present invention is formed by the direct transfer function of the surface texture of the at least one former. A preferred textured former surface for the ambidextrous working glove of the present invention has been found to be provided by at least one form that has a fish-scale textured finish. Transfer texturing from such a surface provides a highly desirable textured interior and outer surfaces. The textured interior surface provides a highly desirable hand-engaging surface and the textured exterior surface provides highly desirable grip.

One of ordinary skill in the art can readily appreciate that the ability of the at least one former to impart or transfer a texture to both the inner and outer surfaces of the ambidextrous working glove of the present invention can vary in response to a variety of factors including, but not limited to the polymer forming the film of the working glove, the thickness of the working glove, and the shape and/or depth of the texture of the at least one former.

In one embodiment, 100% of the surface of the former is textured to impart or transfer a texture to both the inner and outer surfaces of the ambidextrous working glove of the present invention. In an alternate embodiment, less than 100% of the surface of the former is textured to impart or transfer a texture to both the inner and outer surfaces of the ambidextrous working glove of the present invention. In an alternate embodiment, 90% of the surface of the former is textured to impart or transfer a texture to both the inner and outer surfaces of the ambidextrous working glove of the present invention. In an alternate embodiment, 80% of the surface of the former is textured to impart or transfer a texture to both the inner and outer surfaces of the ambidextrous working glove of the present invention. In an alternate embodiment, 70% of the surface of the former is textured to impart or transfer a texture to both the inner and outer surfaces of the ambidextrous working glove of the present invention. In an alternate embodiment, 60% of the surface of the former is textured to impart or transfer a texture to both the inner and outer surfaces of the ambidextrous working glove of the present invention. In an alternate embodiment, 50% of the surface of the former is textured to impart or transfer a texture to both the inner and outer surfaces of the ambidextrous working glove of the present invention. In an alternate embodiment, 40% of the surface of the former is textured to impart or transfer a texture to both the inner and outer surfaces of the ambidextrous working glove of the present invention. In an alternate embodiment, 30% of the surface of the former is textured to impart or transfer a texture to both the inner and outer surfaces of the ambidextrous working glove of the present invention. In an alternate embodiment, 20% of the surface of the former is textured to impart or transfer a texture to both the inner and outer surfaces of the ambidextrous working glove of the present invention. In an alternate embodiment, 10% of the surface of the former is textured to impart or transfer a texture to both the inner and outer surfaces of the ambidextrous working glove of the present invention.

In one embodiment, the surface of the at least one former is textured on the front and back of the region of the at least one former that forms the fingers of the ambidextrous working glove of the present invention. In one embodiment, the surface of the at least one former is textured on the region of the at least one former that forms the palm of the ambidextrous working glove of the present invention. In one embodiment, the surface of the at least one former is textured on the region of the at least one former that forms the back of the ambidextrous working glove of the present invention. In one embodiment, the surface of the at least one former is textured on the region of the at least one former that forms the region of the thumb that faces the palm of the ambidextrous working glove of the present invention.

In one embodiment, the texture transferred or imparted to the inner and outer surfaces of the ambidextrous working glove of the present invention does not weaken the glove. In one embodiment, the texture transferred or imparted to the inner and outer surfaces of the ambidextrous working glove of the present invention does not affect removal of the glove from the at least one former.

In one embodiment, an individual fish-scale in the textured surface of the at least one former is etched into the at least one former at a depth of about 0.4 mm, and is about 2.3 mm wide and 3.4 mm high.

FIGS. 2 to 8 show various views of an at least one former that is used to form one embodiment of the ambidextrous working glove of the present invention, showing how the individual fish scales are etched into the at least one former.

The size of the at least one former determines the size of the ambidextrous working glove of the present invention. For example, a "small" former would be used to form a "small" glove, and so on.

Figure 3:
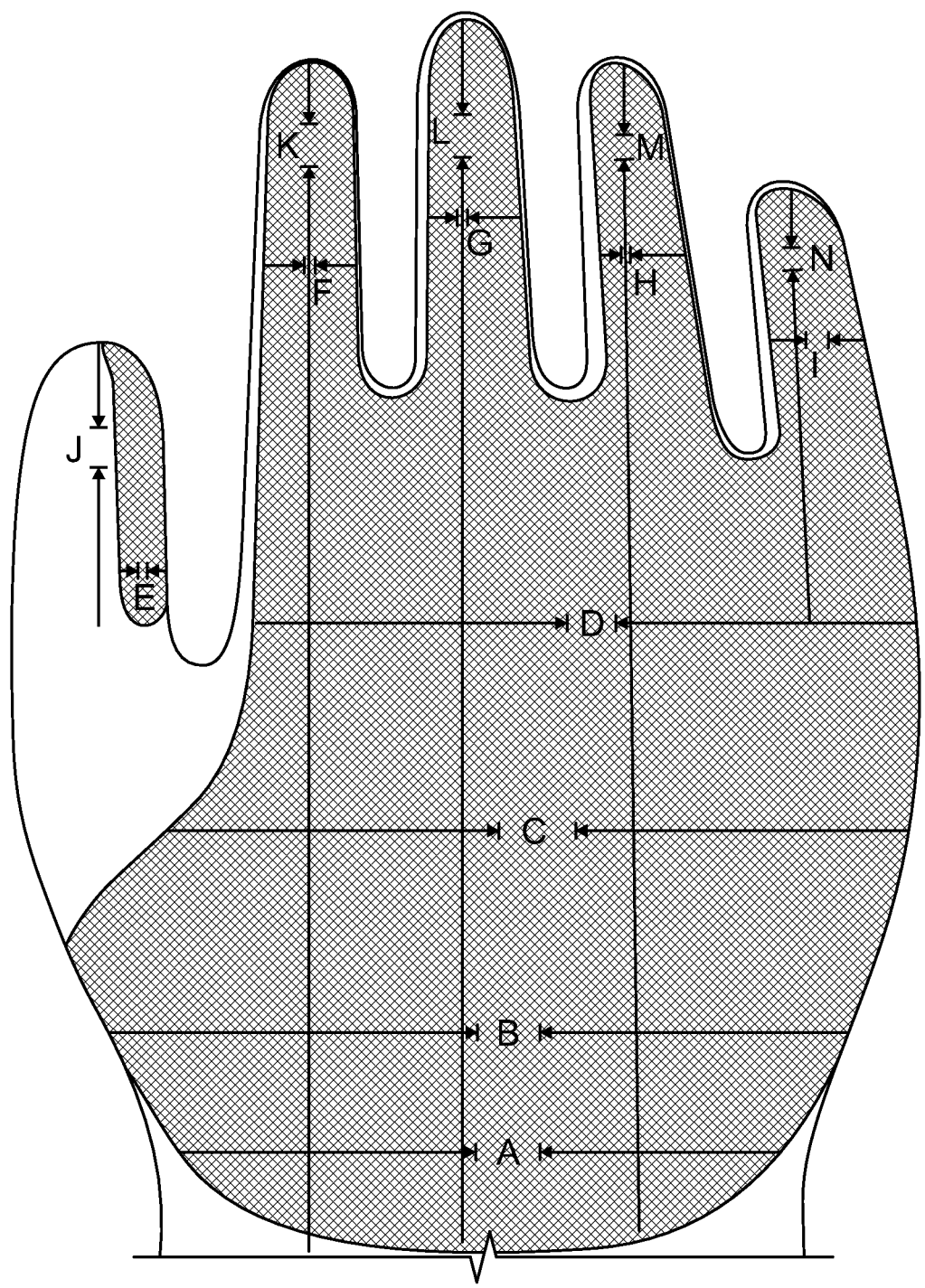
FIG. 3 shows the dimensions of the fish scale pattern etched or engraved into an at least one former used to make one embodiment of the ambidextrous working glove of the present invention.
Figure 4:
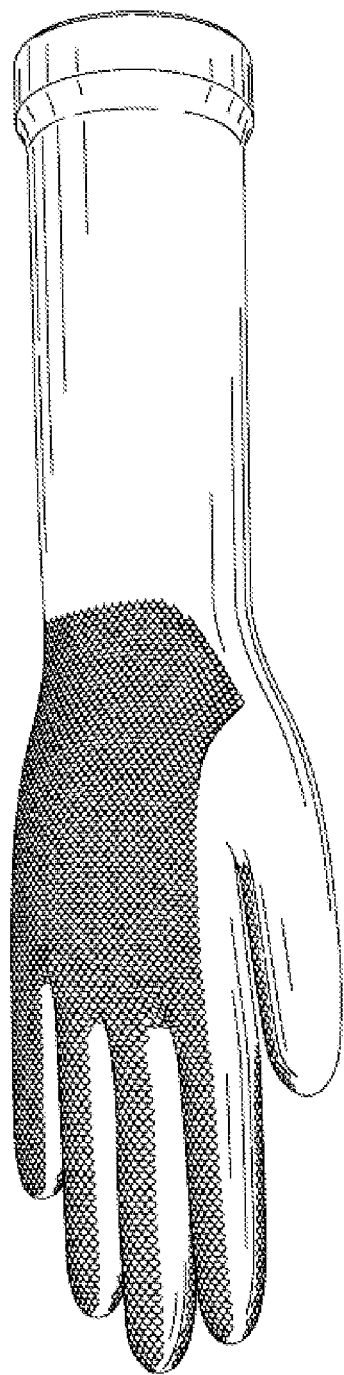
FIG. 4 shows a perspective view of an at least one former that is utilized to form one embodiment of the ambidextrous working glove of the present invention.
Figure 5:
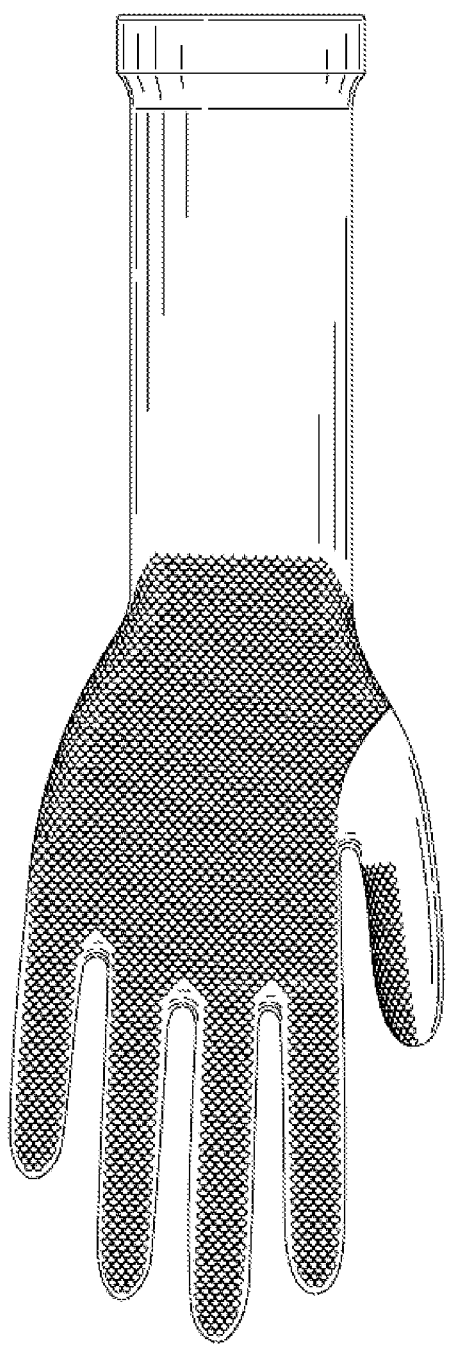
FIG. 5 shows a front view of an at least one former that is utilized to form one embodiment of the ambidextrous working glove of the present invention.
Figure 6:
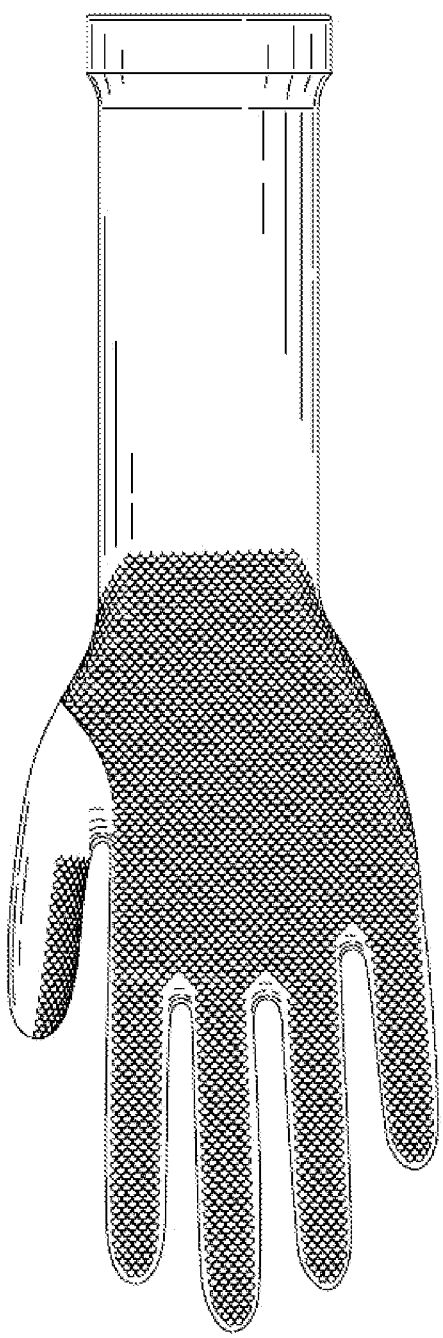
FIG. 6 shows a rear view of an at least one former that is utilized to form one embodiment of the ambidextrous working glove of the present invention.
Figure 7A:
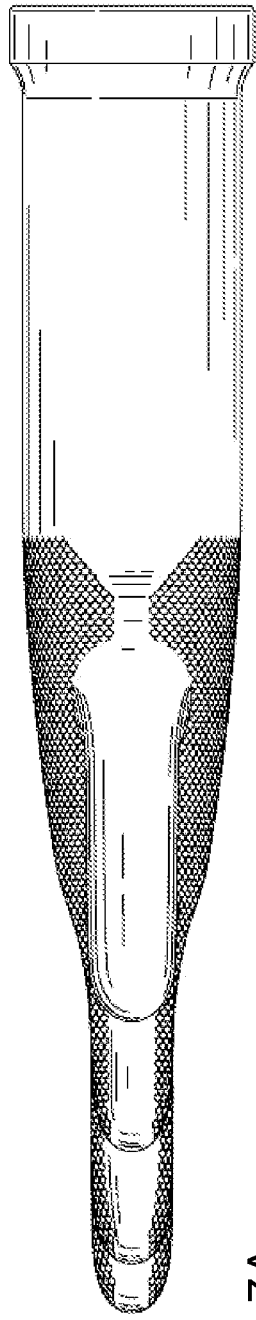
FIG. 7 panel a) shows a left view of an at least one former that is utilized to form one embodiment of the ambidextrous working glove of the present invention. Panel b) shows a right view of an at least one former that is utilized to form one embodiment of the ambidextrous working glove of the present invention.
Figure 7B:
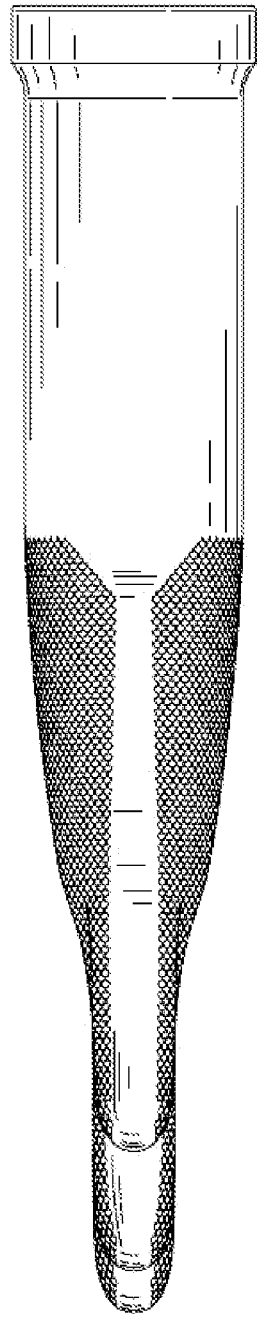

Referring to FIG. 3, showing an at least one former that is used to form one "large" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 60 mm; the width of the area shown by line "B" is 96 mm; the width of the area shown by line "C" is 83 mm; the width of the area shown by line "D" is 88 mm; the width of the area shown by line "E" is 26 mm; the width of the area shown by line "F" is 17 mm; the width of the area shown by line "G" is 19 mm; the width of the area shown by line "H" is 16 mm; the width of the area shown by line "I" is 17 mm; the length of the area shown by line "J" is 50 mm; the length of the area shown by line "K" is 195 mm; the length of the area shown by line "L" is 218 mm; the length of the area shown by line "M" is 207 mm; and the length of the area shown by line "N" is 95 mm. The width of the former indicated at line "A" is 97 mm; the width of the former indicated at line "B" is 115 mm; the width of the former indicated at line "C" is 122 mm; the width of the former indicated at line "D" is 110 mm; the width of the former indicated at line "E" is 35.5 mm; the width of the former indicated at line "F" is 35 mm; the width of the former indicated at line "G" is 36 mm; the width of the former indicated at line "H" is 34 mm; and the width of the former indicated at line "I" is 30 mm.

In an alternate embodiment, the former that is used to form one "small" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 45 mm; the width of the area shown by line "B" is 76 mm; the width of the area shown by line "C" is 73 mm; the width of the area shown by line "D" is 88 mm; the width of the area shown by line "E" is 16 mm; the width of the area shown by line "F" is 14 mm; the width of the area shown by line "G" is 15 mm; the width of the area shown by line "H" is 13 mm; the width of the area shown by line "I" is 13 mm; the length of the area shown by line "J" is 45 mm; the length of the area shown by line "K" is 172 mm; the length of the area shown by line "L" is 184 mm; the length of the area shown by line "M" is 172 mm; and the length of the area shown by line "N" is 85 mm. The width of the former indicated at line "A" is 82.5 mm; the width of the former indicated at line "B" is 95.5 mm; the width of the former indicated at line "C" is 106 mm; the width of the former indicated at line "D" is 88.5 mm; the width of the former indicated at line "E" is 29 mm; the width of the former indicated at line "F" is 29 mm; the width of the former indicated at line "G" is 31 mm; the width of the former indicated at line "H" is 30 mm; and the width of the former indicated at line "I" is 29 mm.

In an alternate embodiment, the former that is used to form one "medium" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 50 mm; the width of the area shown by line "B" is 86 mm; the width of the area shown by line "C" is 74 mm; the width of the area shown by line "D" is 79 mm; the width of the area shown by line "E" is 20 mm; the width of the area shown by line "F" is 16 mm; the width of the area shown by line "G" is 18 mm; the width of the area shown by line "H" is 15 mm; the width of the area shown by line "I" is 14 mm; the length of the area shown by line "J" is 46 mm; the length of the area shown by line "K" is 182 mm; the length of the area shown by line "L" is 195 mm; the length of the area shown by line "M" is 186 mm; and the length of the area shown by line "N" is 95 mm. The width of the former indicated at line "A" is 89 mm; the width of the former indicated at line "B" is 105 mm; the width of the former indicated at line "C" is 115 mm; the width of the former indicated at line "D" is 100 mm; the width of the former indicated at line "E" is 33 mm; the width of the former indicated at line "F" is 32 mm; the width of the former indicated at line "G" is 32.5 mm; the width of the former indicated at line "H" is 30 mm; and the width of the former indicated at line "I" is 27.5 mm.

In an alternate embodiment, the former that is used to form one "extra large" or "XL" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 66 mm; the width of the area shown by line "B" is 92 mm; the width of the area shown by line "C" is 90 mm; the width of the area shown by line "D" is 95 mm; the width of the area shown by line "E" is 26 mm; the width of the area shown by line "F" is 17 mm; the width of the area shown by line "G" is 17 mm; the width of the area shown by line "H" is 17 mm; the width of the area shown by line "I" is 16 mm; the length of the area shown by line "J" is 55 mm; the length of the area shown by line "K" is 208 mm; the length of the area shown by line "L" is 220 mm; the length of the area shown by line "M" is 208 mm; and the length of the area shown by line "N" is 105 mm. The width of the former indicated at line "A" is 101 mm; the width of the former indicated at line "B" is 115 mm; the width of the former indicated at line "C" is 134 mm; the width of the former indicated at line "D" is 116 mm; the width of the former indicated at line "E" is 37.5 mm; the width of the former indicated at line "F" is 38 mm; the width of the former indicated at line "G" is 37.5 mm; the width of the former indicated at line "H" is 35 mm; and the width of the former indicated at line "I" is 31.5 mm.

In an alternate embodiment, the former that is used to form one "extra extra large" or "XXL" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 67 mm; the width of the area shown by line "B" is 101 mm; the width of the area shown by line "C" is 108 mm; the width of the area shown by line "D" is 103 mm; the width of the area shown by line "E" is 23 mm; the width of the area shown by line "F" is 22 mm; the width of the area shown by line "G" is 21 mm; the width of the area shown by line "H" is 20 mm; the width of the area shown by line "I" is 19 mm; the length of the area shown by line "J" is 54 mm; the length of the area shown by line "K" is 207 mm; the length of the area shown by line "L" is 222 mm; the length of the area shown by line "M" is 211 mm; and the length of the area shown by line "N" is 100 mm. The width of the former indicated at line "A" is 109 mm; the width of the former indicated at line "B" is 119 mm; the width of the former indicated at line "C" is 140 mm; the width of the former indicated at line "D" is 126 mm; the width of the former indicated at line "E" is 40 mm; the width of the former indicated at line "F" is 40 mm; the width of the former indicated at line "G" is 41 mm; the width of the former indicated at line "H" is 38 mm; and the width of the former indicated at line "I" is 38 mm.

In an alternate embodiment, the former that is used to form one "extra extra extra large" or "XXXL" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 62 mm; the width of the area shown by line "B" is 103 mm; the width of the area shown by line "C" is 112 mm; the width of the area shown by line "D" is 110 mm; the width of the area shown by line "E" is 24 mm; the width of the area shown by line "F" is 20 mm; the width of the area shown by line "G" is 20 mm; the width of the area shown by line "H" is 20 mm; the width of the area shown by line "I" is 18 mm; the length of the area shown by line "J" is 54 mm; the length of the area shown by line "K" is 205 mm; the length of the area shown by line "L" is 224 mm; the length of the area shown by line "M" is 212 mm; and the length of the area shown by line "N" is 105 mm. The width of the former indicated at line "A" is 124 mm; the width of the former indicated at line "B" is 144 mm; the width of the former indicated at line "C" is 156 mm; the width of the former indicated at line "D" is 136 mm; the width of the former indicated at line "E" is 40.5 mm; the width of the former indicated at line "F" is 39 mm; the width of the former indicated at line "G" is 40 mm; the width of the former indicated at line "H" is 37.5 mm; and the width of the former indicated at line "I" is 34 mm.

Figure 16B:
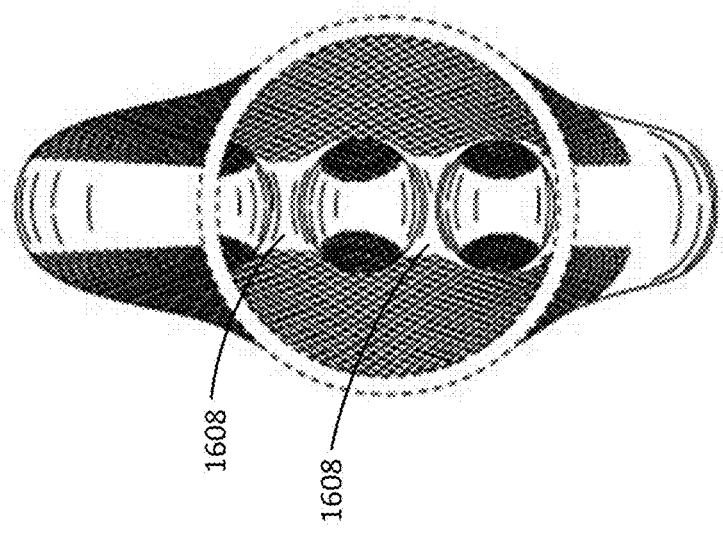
FIG. 16 panel a) shows a top view of one embodiment of the ambidextrous working glove of the present invention. Panel b) shows a bottom view of one embodiment of the ambidextrous working glove of the present invention.
Figure 16A:
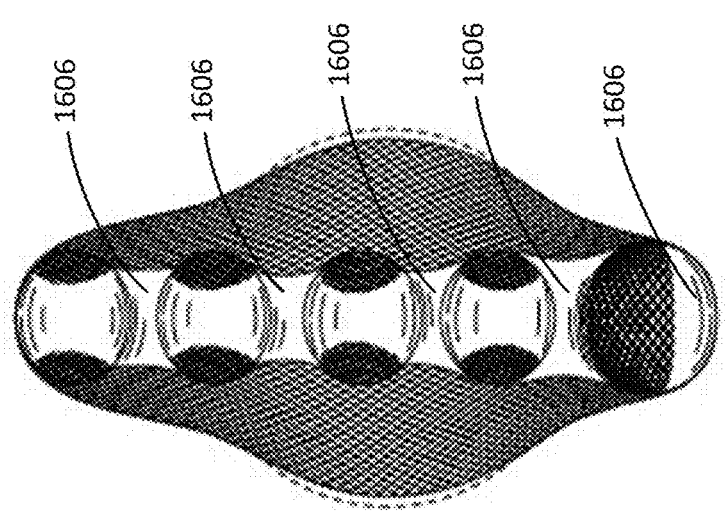
Figure 17:
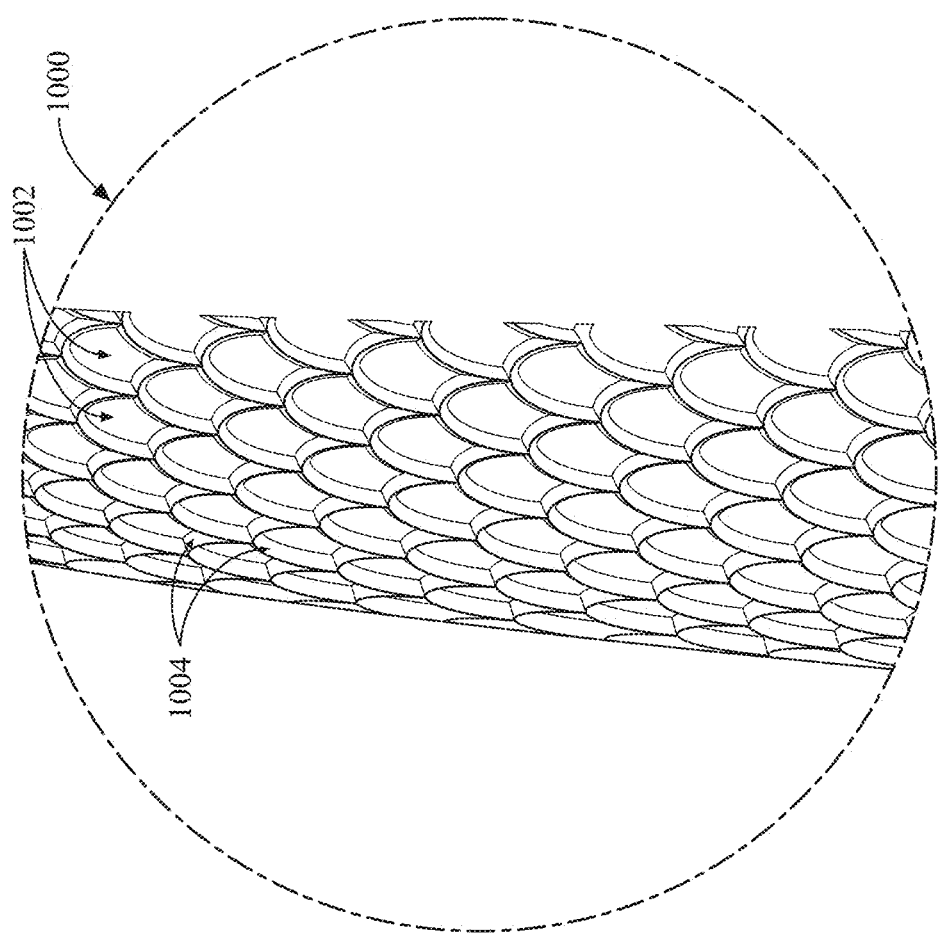
FIG. 17 shows an enlarged portion of the thumb region of the ambidextrous working glove of FIG. 10A.
Figure 18:
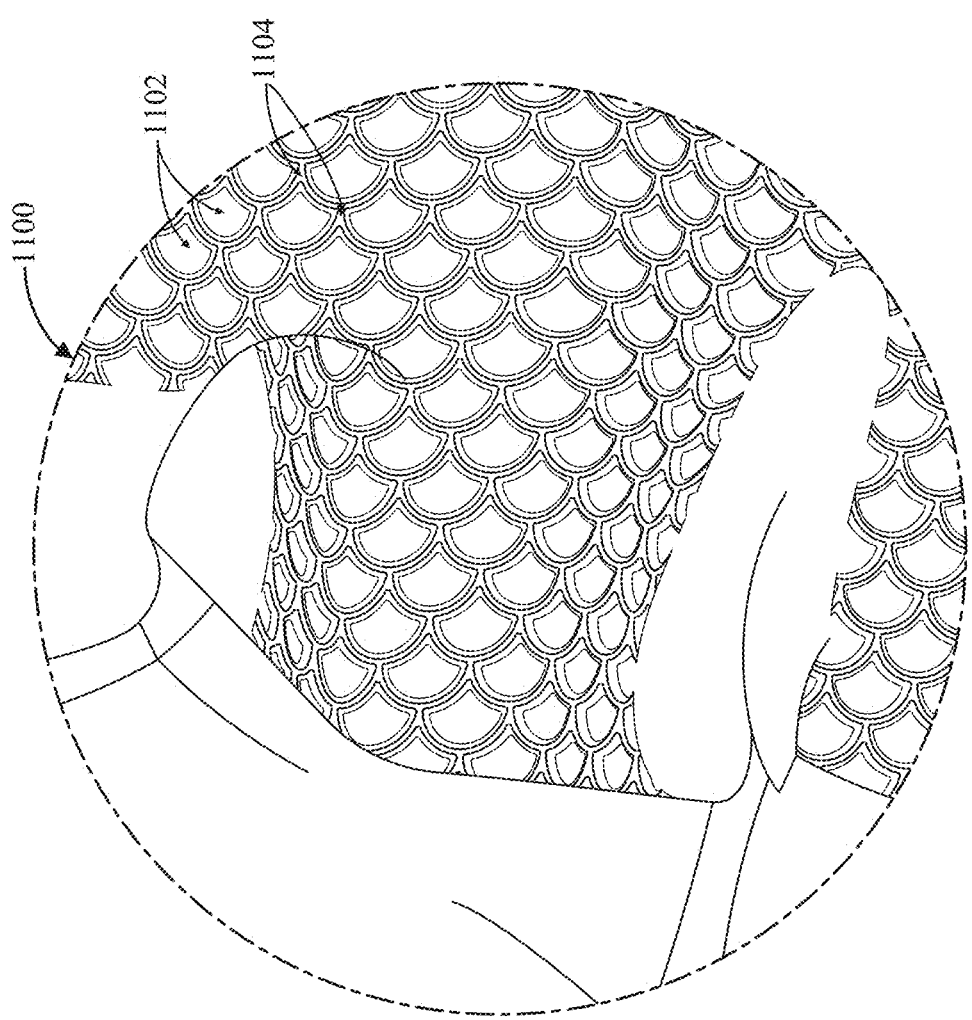
FIG. 18 shows an enlarged portion of the inner surface of a finger of the ambidextrous working glove of FIG. 11.

The textured inner and outer surfaces of one embodiment of the ambidextrous working glove of the present invention can be seen in greater detail in FIGS. 9 to 11 and FIGS. 17 to 18. A graphical representation of the fish-scale textured outer surface of an ambidextrous working glove of the present invention is shown in FIGS. 12 to 17. A graphical representation of the fish-scale textured inner surface of an ambidextrous working glove of the present invention is shown in FIG. 18.

Figure 9:
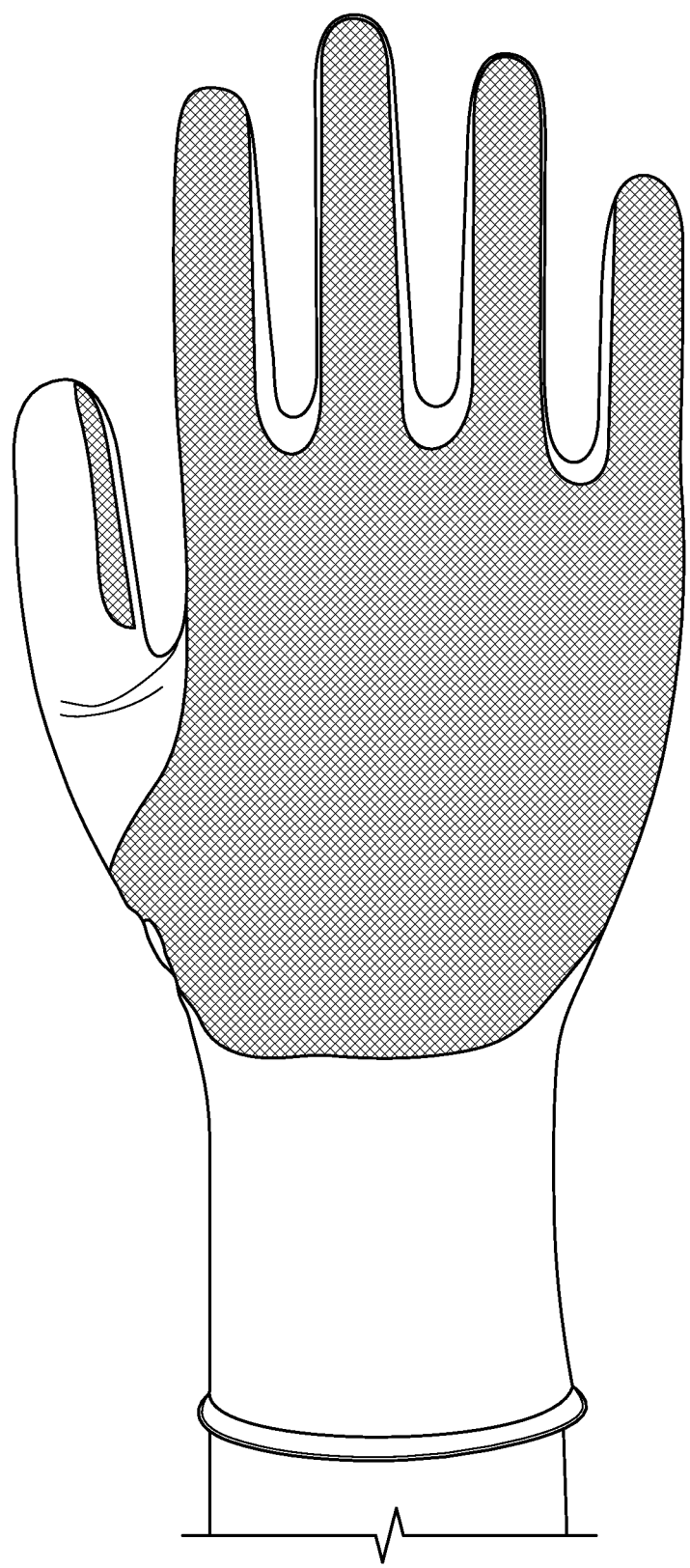
FIG. 9 shows one embodiment of the ambidextrous working glove of the present invention on an at least one former prior to stripping from the former.

Further, as illustrated in the embodiment of FIG. 9, the exterior surface of the ambidextrous working glove can have portions with an external textured gripping pattern and also non-textured portions. As shown in FIG. 9, the non-textured portions are located between each of the four fingers of ambidextrous working glove and on a thumb facing away from the four fingers.

Figure 10B:
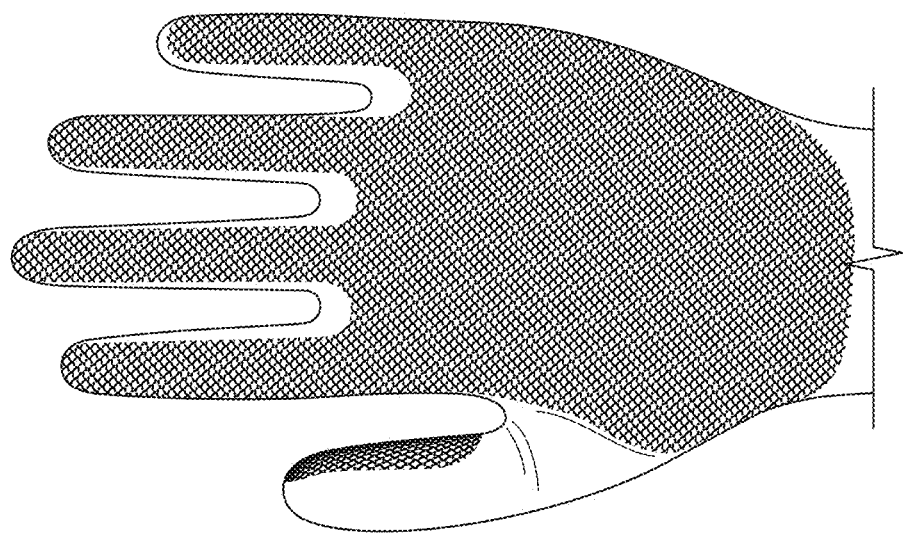
FIG. 10 panel (a) shows the palm of one embodiment of the ambidextrous working glove of the present invention. Panel (b) shows the back of one embodiment of the wearable glove of the present invention.
Figure 10A:
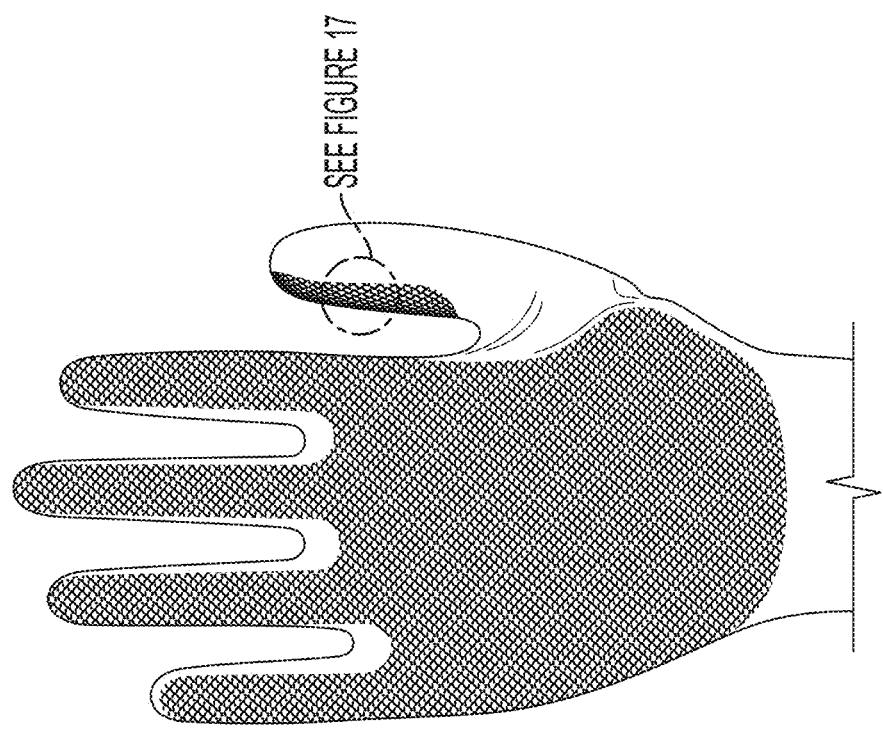
Figure 12:
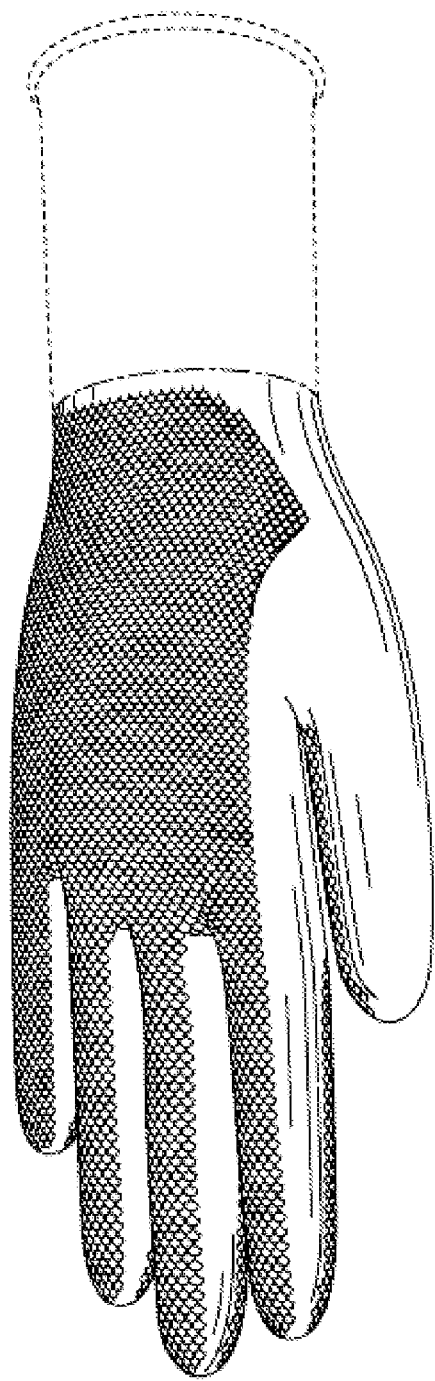
FIG. 12 shows a perspective view of one embodiment of the ambidextrous working glove of the present invention.
Figure 13:
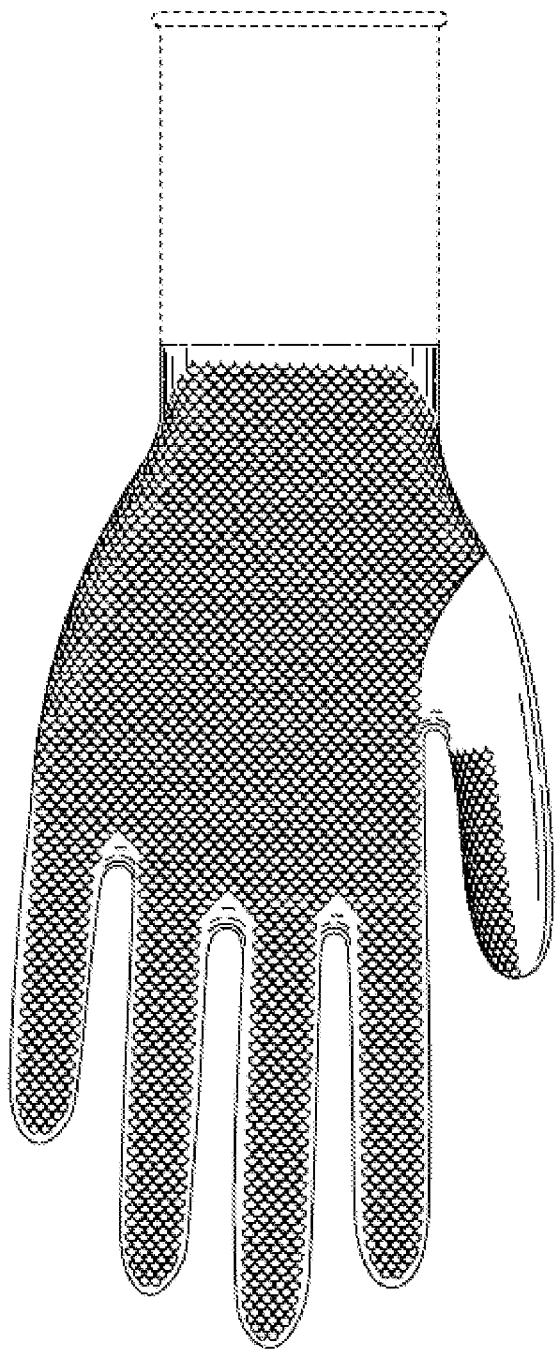
FIG. 13 shows a front view of one embodiment of the ambidextrous working glove of the present invention.
Figure 14:
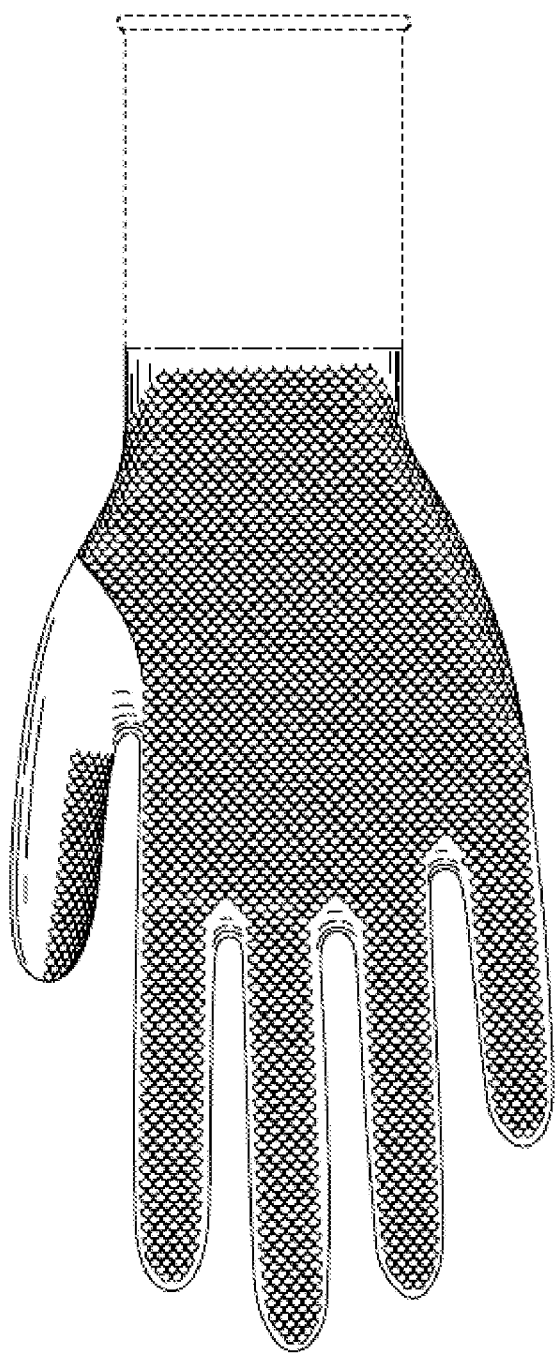
FIG. 14 shows a rear view of one embodiment of the ambidextrous working glove of the present invention.
Figure 15A:
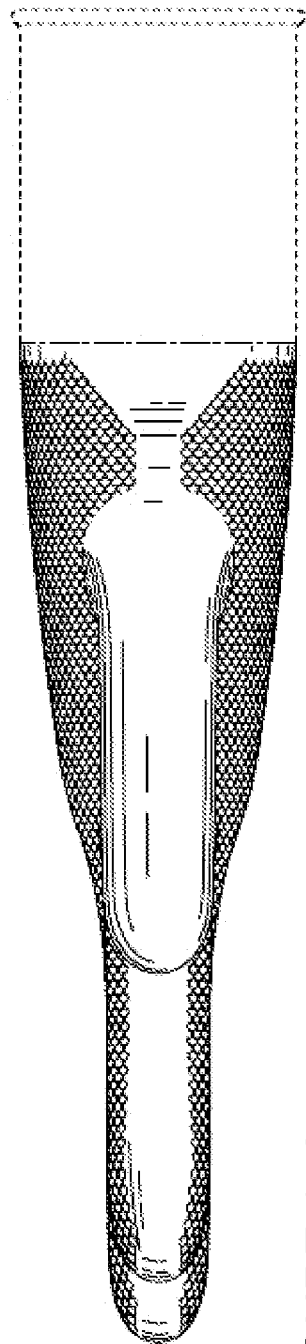
FIG. 15 panel a) shows a left view of one embodiment of the ambidextrous working glove of the present invention. Panel b) shows a right view of one embodiment of the ambidextrous working glove of the present invention.
Figure 15B:
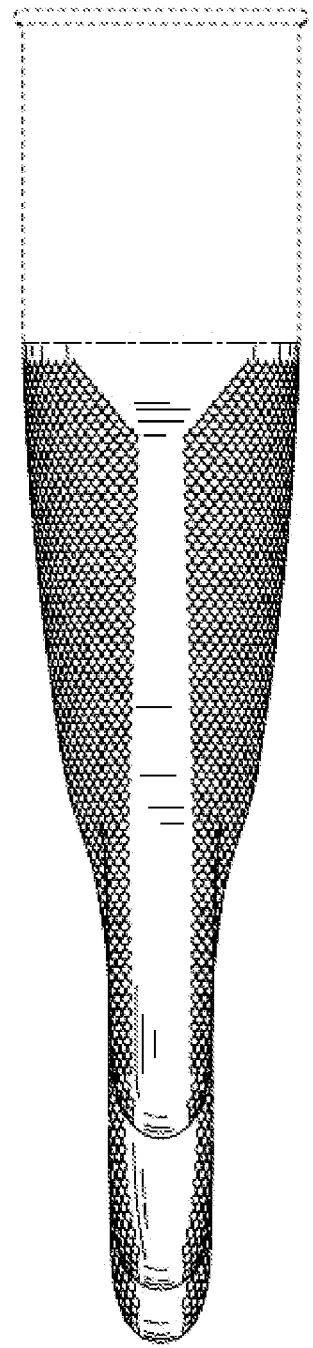

Referring to FIG. 17, FIG. 17 is an enlarged portion 1000 of the thumb region of the embodiment of the ambidextrous working glove of FIG. 10. The enlarged portion 1000 illustrates an external textured gripping pattern which includes depressions 1002 and ridges 1004. As stated elsewhere in this application, the external textured gripping pattern, which is shown in the enlarged portion 1000 in FIG. 17 and contains depressions 1002 and ridges 1004, can be formed by the direct transfer function of the surface texture of the at least one former.

Referring to FIG. 18, FIG. 18 is an enlarged portion 1100 of the inner surface of the embodiment of the ambidextrous working glove of FIG. 11. The enlarged portion 1100 better illustrates an internal textured gripping pattern which includes islands 1102 and channels 1104. The islands 1102 and channels 1104 of the internal textured gripping pattern can be formed by the direct transfer function of the surface texture of the at least one former. Further, as illustrated in the embodiments of FIG. 11 and FIG. 18, the interior surface of the ambidextrous working glove can have textured and non-textured portions. As shown in FIG. 11, the non-textured portions are located between each of the four fingers of ambidextrous working glove.

Referring to FIG. 16A, FIG. 16A includes non-textured portions 1606 on the exterior surface of the ambidextrous working glove located between each of the four fingers and on a thumb region, facing away from the four fingers. Similarly, FIG. 16B includes a non-textured portion 1608 on the interior surface of the ambidextrous working glove located between each of the four fingers of the ambidextrous working glove and on a thumb region, facing away from the four fingers.

Figure 8B:
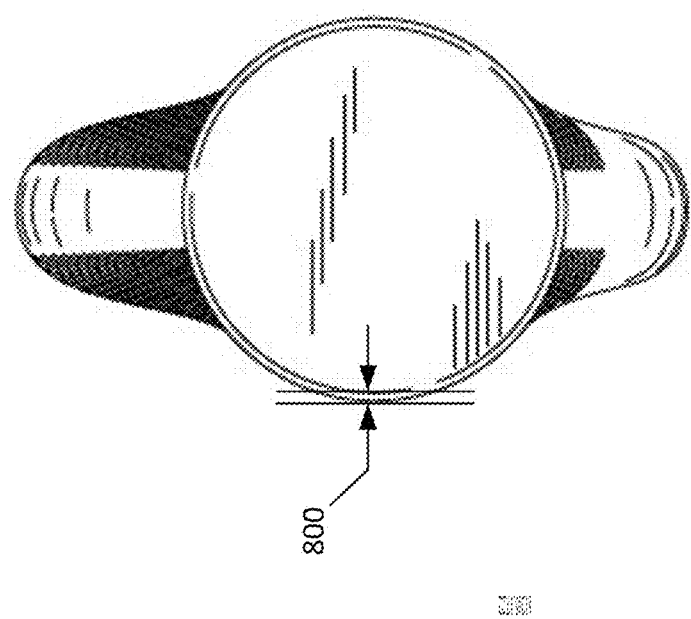
FIG. 8 panel a) shows a top view of an at least one former that is utilized to form one embodiment of the ambidextrous working glove of the present invention. Panel b) shows a bottom view of an at least one former that is utilized to form one embodiment of the ambidextrous working glove of the present invention.
Figure 8A:
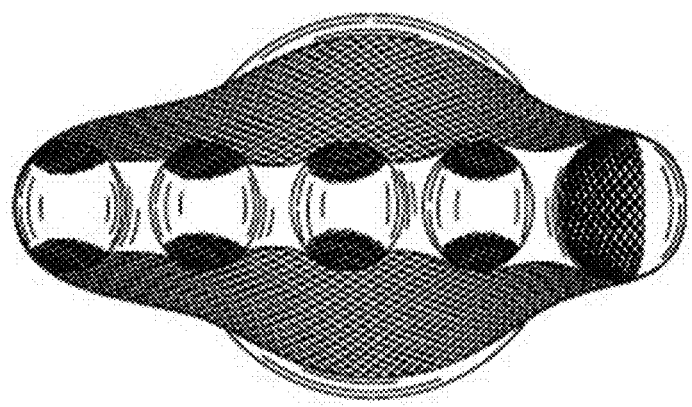

With reference to FIG. 8B, a thickness 800 of the ambidextrous working glove at a non-textured portion is shown as extending between the exterior surface and the interior surface of the ambidextrous working glove at locations that are non-textured. As illustrated in the embodiment of FIG. 8B, the ambidextrous working glove of the present invention can have measured thickness 800 in a non-textured area selected from the range of thicknesses spanning from about 6 mil to about 10 mil.

In one embodiment, the ambidextrous working glove of the present invention has a weight of about 20 g. In an alternate embodiment, the ambidextrous working glove of the present invention has a weight of about 19 g. In an alternate embodiment, the ambidextrous working glove of the present invention has a weight of about 18 g. In an alternate embodiment, the ambidextrous working glove of the present invention has a weight of about 17 g. In an alternate embodiment, the ambidextrous working glove of the present invention has a weight of about 16 g. In an alternate embodiment, the ambidextrous working glove of the present invention has a weight of about 15 g. In an alternate embodiment, the ambidextrous working glove of the present invention has a weight of about 14 g. In an alternate embodiment, the ambidextrous working glove of the present invention has a weight of about 13 g. In an alternate embodiment, the ambidextrous working glove of the present invention has a weight of about 12 g. In an alternate embodiment, the ambidextrous working glove of the present invention has a weight of about 11 g. In an alternate embodiment, the ambidextrous working glove of the present invention has a weight of about 10 g.

In one embodiment, the ambidextrous working glove of the present invention complies with European Standard EN420:2003 and A1:2009 clause 5 sizing and dexterity regulations.

In one embodiment, the ambidextrous working glove of the present invention complies with European Standard BS EN374:2003 chemical and micro-organism protection regulations.

In one embodiment, second polymer solution is a solution that allows the ambidextrous working glove of the present invention to slide over a wearer's hand while the glove is being donned. In one embodiment, the second polymer solution is a polyurethane solution.

In one embodiment, the second polymer solution is a solution comprising polyurethane (10% v/v final concentration), and 12% ammonia (2% final concentration) in water.

In one embodiment, the second polymer solution forms a cholorinated film on the inner surface of the ambidextrous working glove of the present invention. In one embodiment, the second polymer solution forms a cholorinated film on the inner surface of the ambidextrous working glove of the present invention according to the methods described in WO2010023634. In one embodiment, the second polymer solution is a polyisoprene solution. In one embodiment, the polyisoprene solution is the polyisoprene solution described in EP2381100 A1.

The present invention is further illustrated, but not limited by, the following examples.

EXAMPLES

Example 1: Testing Embodiments of the Ambidextrous Working Glove of the Present Invention for Resistance to Permeation by Chemicals According to BS EN 374-3:2003

Samples of powder-free 8 mil black, 10 mil black and 8 mil blue nitrile gloves were tested in accordance with BS EN 374:2003 part 3. The results are shown in the tables below.

The permeation performance levels are defined as follows: Level 1 is defined as an observed measured breakthrough time of greater than 10 minutes. Level 2 is defined as an observed measured breakthrough time of greater than 30 minutes. Level 3 is defined as an observed measured breakthrough time of greater than 60 minutes. Level 4 is defined as an observed measured breakthrough time of greater than 120 minutes. Level 5 is defined as an observed measured breakthrough time of greater than 240 minutes. Level 6 is defined as an observed measured breakthrough time of greater than 480 minutes.

TABLE 2

Results Obtained from 8-mil Powder-Free Black Nitrile Gloves Tested According to BS EN 374: 2003, part 3, using Methanol as the Testing Agent

| Test/Property | Specimen | Results | Performance |
|---|---|---|---|
| BS EN 374-3: 2003 Chemical Permeation | Nitrile disposable gloves, Powder-free 8 mil black | Chemical: Methanol CAS No: 67-56-1 Detection system: GC FID Collection medium: Dry air Loop System: Open Test temperature: 23° C. | The samples tested did not meet with the minimum breakthrough time for a performance level 1 to be achieved |

| | Sample thickness (mm) | Breakthrough time (mins) |
|---|---|---|
| 1 | 0.24 | 1 |
| 2 | 0.27 | 3 |
| 3 | 0.23 | <1 |
| Mean | 0.25 | 1 |
| Lowest result | — | <1 |
| Appearance of sample after testing | | No change |

TABLE 3

Results Obtained from 8-mil Powder-Free Black Nitrile Gloves Tested According to BS EN 374: 2003, part 3, using n-Heptane as the Testing Agent

| Test/Property | Specimen | Results | Performance |
|---|---|---|---|
| BS EN 374-3: 2003 Chemical Permeation | Nitrile disposable gloves, Powder-free 8 mil black | Chemical: n-Heptane CAS No: 142-82-5 Detection system: GC FID Collection medium: Dry air Loop System: Open Test temperature: 23° C. | Level 1 |

| | Sample thickness (mm) | Breakthrough time (mins) |
|---|---|---|
| 1 | 0.28 | 22 |
| 2 | 0.28 | 56 |
| 3 | 0.27 | 26 |
| Mean | 0.28 | 34 |
| Lowest result | — | 22 |
| Appearance of sample after testing | | No change |

TABLE 4

Results Obtained from 8-mil Powder-Free Black Nitrile Gloves Tested According to BS EN 374: 2003, part 3, using Acetonitrile as the Testing Agent

| Test/Property | Specimen | Results | Performance |
|---|---|---|---|
| BS EN 374-3: 2003 Chemical Permeation | Nitrile disposable gloves, Powder-free 8 mil black | Chemical: Acetonitrile CAS No: 75-05-8 Detection system: GC FID Collection medium: Dry air Loop System: Open Test temperature: 23° C. | Level 6 |

| | Sample thickness (mm) | Breakthrough time (mins) |
|---|---|---|
| 1 | 0.29 | <1 |
| 2 | 0.27 | <1 |
| 3 | 0.26 | <1 |
| Mean | 0.27 | <1 |
| Lowest result | — | <1 |
| Appearance of sample after testing | | No change |

TABLE 5

Results Obtained from 8-mil Powder-Free Black Nitrile Gloves Tested According to BS EN 374: 2003, part 3, using 40% Sodium Hydroxide as the Testing Agent

| Test/Property | Specimen | Results | Performance |
|---|---|---|---|
| BS EN 374-3: 2003 Chemical Permeation | Nitrile disposable gloves, Powder-free 8 mil black | Chemical: 40% Sodium hydroxide CAS No: 1310-73-2 Detection system: Conductivity Collection medium: Deionised water Loop System: Closed Test temperature: 23° C. | Level 6 |

| | Sample thickness (mm) | Breakthrough time (mins) |
|---|---|---|
| 1 | 0.32 | >480 |
| 2 | 0.32 | >480 |
| 3 | 0.32 | >480 |
| Mean | 0.32 | >480 |
| Lowest result | — | >480 |
| Appearance of sample after testing | | No change |

TABLE 6

Results Obtained from 10-mil Powder-Free Black Nitrile Gloves Tested According to BS EN 374: 2003, part 3, using Methanol as the Testing Agent

| Test/Property | Specimen | Results | Performance |
|---|---|---|---|
| BS EN 374-3: 2003 Chemical Permeation | Nitrile disposable gloves, Powder-free 10 mil black | Chemical: Methanol CAS No: 67-56-1 Detection system: GC FID Collection medium: Dry air Loop System: Open Test temperature: 23° C. | The samples tested did not meet with the minimum breakthrough time for a performance level 1 to be achieved |

| | Sample thickness (mm) | Breakthrough time (mins) |
|---|---|---|
| 1 | 0.38 | 1 |
| 2 | 0.32 | 4 |
| 3 | 0.35 | <1 |
| Mean | 0.35 | 2 |
| Lowest result | — | <1 |
| Appearance of sample after testing | No change | |

TABLE 7

Results Obtained from 10-mil Powder-Free Black Nitrile Gloves Tested According to BS EN 374: 2003, part 3, using n-Heptane as the Testing Agent

| Test/Property | Specimen | Results | Performance |
|---|---|---|---|
| BS EN 374-3: 2003 Chemical Permeation | Nitrile disposable gloves, Powder-free 10 mil black | Chemical: n-Heptane CAS No: 142-82-5 Detection system: GC FID Collection medium: Dry air Loop System: Open Test temperature: 23° C. | Level 3 |

| | Sample thickness (mm) | Breakthrough time (mins) |
|---|---|---|
| 1 | 0.32 | 92 |
| 2 | 0.35 | 77 |
| 3 | 0.32 | 99 |
| Mean | 0.33 | 89 |
| Lowest result | — | 77 |
| Appearance of sample after testing | No change | |

TABLE 8

Results Obtained from 10-mil Powder-Free Black Nitrile Gloves Tested According to BS EN 374: 2003, part 3, using Acetonitrile as the Testing Agent

| Test/Property | Specimen | Results | Performance |
|---|---|---|---|
| BS EN 374-3: 2003 Chemical Permeation | Nitrile disposable gloves, Powder-free 10 mil black | Chemical: Acetonitrile CAS No: 75-05-8 Detection system: GC FID Collection medium: Dry air Loop System: Open Test temperature: 23° C. | The samples tested did not meet with the minimum breakthrough time for a performance level 1 to be achieved |

| | Sample thickness (mm) | Breakthrough time (mins) |
|---|---|---|
| 1 | 0.31 | <1 |
| 2 | 0.37 | <1 |
| 3 | 0.32 | <1 |
| Mean | 0.33 | <1 |
| Lowest result | — | <1 |
| Appearance of sample after testing | No change | |

TABLE 9

Results Obtained from 10-mil Powder-Free Black Nitrile Gloves Tested According to BS EN 374: 2003, part 3, using 40% Sodium Hydroxide as the Testing Agent

| Test/Property | Specimen | Results | Performance |
|---|---|---|---|
| BS EN 374-3: 2003 Chemical Permeation | Nitrile disposable gloves, Powder-free 10 mil black | Chemical: 40% Sodium hydroxide CAS No: 1310-73-2 Detection system: Conductivity Collection medium: Deionised water Loop System: Closed Test temperature: 23° C. | Level 6 |

| | Sample thickness (mm) | Breakthrough time (mins) |
|---|---|---|
| 1 | 0.30 | >480 |
| 2 | 0.32 | >480 |
| 3 | 0.35 | >480 |
| Mean | 0.32 | >480 |
| Lowest result | — | >480 |
| Appearance of sample after testing | No change | |

TABLE 10

Results Obtained from 8-mil Powder-Free Blue Nitrile Gloves Tested According to BS EN 374: 2003, part 3, using Methanol as the Testing Agent

| Test/Property | Specimen | Results | Performance |
|---|---|---|---|
| BS EN 374-3: 2003 Chemical Permeation | Nitrile disposable gloves, Powder-free 8 mil blue | Chemical: Methanol CAS No: 67-56-1 Detection system: GC FID Collection medium: Dry air Loop System: Open Test temperature: 23° C. | The samples tested did not meet with the minimum breakthrough time for a performance level 1 to be achieved |

| | Sample thickness (mm) | Breakthrough time (mins) |
|---|---|---|
| 1 | 0.24 | <1 |
| 2 | 0.26 | <1 |
| 3 | 0.25 | <1 |
| Mean | 0.25 | <1 |
| Lowest result | — | <1 |
| Appearance of sample after testing | Discolored | |

TABLE 11

Results Obtained from 8-mil Powder-Free Blue Nitrile Gloves Tested According to BS EN 374: 2003, part 3, using n-Heptane as the Testing Agent

| Test/Property | Specimen | Results | Performance |
|---|---|---|---|
| BS EN 374-3: 2003 Chemical Permeation | Nitrile disposable gloves, Powder-free 8 mil blue | Chemical: n-Heptane CAS No: 142-82-5 Detection system: GC FID Collection medium: Dry air Loop System: Open Test temperature: 23° C. | Level 5 |

| | Sample thickness (mm) | Breakthrough time (mins) |
|---|---|---|
| 1 | 0.24 | 256 |
| 2 | 0.26 | 258 |
| 3 | 0.28 | 260 |
| Mean | 0.26 | 258 |
| Lowest result | — | 256 |
| Appearance of sample after testing | No change | |

TABLE 12

Results Obtained from 8-mil Powder-Free Blue Nitrile Gloves Tested According to BS EN 374: 2003, part 3, using Acetonitrile as the Testing Agent

| Test/Property | Specimen | Results | Performance |
|---|---|---|---|
| BS EN 374-3: 2003 Chemical Permeation | Nitrile disposable gloves, Powder-free 8 mil blue | Chemical: Acetonitrile CAS No: 75-05-8 Detection system: GC FID Collection medium: Dry air Loop System: Open Test temperature: 23° C. | The samples tested did not meet with the minimum breakthrough time for a performance level 1 to be achieved |

| | Sample thickness (mm) | Breakthrough time (mins) |
|---|---|---|
| 1 | 0.22 | <1 |
| 2 | 0.25 | <1 |
| 3 | 0.21 | <1 |
| Mean | 0.23 | <1 |
| Lowest result | — | <1 |
| Appearance of sample after testing | No change | |

TABLE 13

Results Obtained from 8-mil Powder-Free Blue Nitrile Gloves Tested According to BS EN 374: 2003, part 3, using 40% Sodium Hydroxide as the Testing Agent

| Test/Property | Specimen | Results | Performance |
|---|---|---|---|
| BS EN 374-3: 2003 Chemical Permeation | Nitrile disposable gloves, Powder-free 8 mil blue | Chemical: 40% Sodium hydroxide CAS No: 1310-73-2 Detection system: Conductivity Collection medium: Deionized water Loop System: Closed Test temperature: 23° C. | Level 6 |

| | Sample thickness (mm) | Breakthrough time (mins) |
|---|---|---|
| 1 | 0.26 | >480 |
| 2 | 0.22 | >480 |
| 3 | 0.24 | >480 |
| Mean | 0.24 | >480 |
| Lowest result | — | >480 |
| Appearance of sample after testing | No change | |

Example 2: Testing Embodiments of the Ambidextrous Working Glove of the Present Invention for Sizing and Dexterity According to EN 420:2003+A1:2009 Clause 5

Samples of powder-free 8 mil black, 10 mil black and 8 mil blue nitrile gloves were tested in accordance with EN 420:2003+A1:2009 Clause 5. The results are shown in the tables below. The permeation performance levels are defined as follows: For sizing, the minimum size for a size 6 glove is 220 mm; the minimum size for a size 7 glove is 230 mm;

the minimum size for a size 8 glove is 240 mm; the minimum size for a size 9 glove is 250 mm; the minimum size for a size 10 glove is 260 mm; the minimum size for a size 11 glove is 270 mm For dexterity, level 1 is defined as a wearer picking up an 11 mm diameter pin; level 2 is defined as a wearer picking up a 9 5 mm diameter pin; level 3 is defined as a wearer picking up an 8 mm diameter pin; level 4 is defined as a wearer picking up a 6 mm diameter pin; level 5 is defined as a wearer picking up a 5 mm diameter pin.

TABLE 14

Results Obtained from 8-mil Powder-Free Black Nitrile Gloves

| EN 420: 2003 + A1: 2009 CLAUSE/ TEST | EN 420: 2003 + A1: 2009 REQUIRE- MENT | TEST RESULTS | UoM (See note 1) | RESULT |
|---|---|---|---|---|
| 5.1 Glove length | See table 2 | Size XXL (11) Length/mm L: 305, R: 290 | ±0.3 mm | PASS |
| 5.1 Comfort and fit | See table 2 | Size XXL (11) Wearer hand size Left: L: 11, C: 8.5 Right: L: 11, C: 8.5 Comments on fit: Thumb slightly long | N/A | PASS |
| 5.2 Dexterity | See table 2 | Size XXL (11) Minimum pin diameter/mm 5.0 | N/A | Level 5 |

TABLE 15

Results Obtained from 10-mil Powder-Free Black Nitrile Gloves

| EN 420: 2003 + A1: 2009 CLAUSE/ TEST | EN 420: 2003 + A1: 2009 REQUIRE- MENT | TEST RESULTS | UoM (See note 1) | RESULT |
|---|---|---|---|---|
| 5.1 Glove length | See table 2 | Size XXL (11) Length/mm L: 307, R: 303 | ±0.3 mm | PASS |
| 5.1 Comfort and fit | See table 2 | Size XXL (11) Wearer hand size Left: L: 11, C: 8.5 Right: L: 11, C: 8.5 Comments on fit: Thumb slightly long | N/A | PASS |
| 5.2 Dexterity | See table 2 | Size XXL (11) Minimum pin diameter/mm 5.0 | N/A | Level 5 |

TABLE 16

Results Obtained from 8-mil Powder-Free Blue Nitrile Gloves

| EN 420: 2003 + A1: 2009 CLAUSE/ TEST | EN 420: 2003 + A1: 2009 REQUIRE- MENT | TEST RESULTS | UoM (See note 1) | RESULT |
|---|---|---|---|---|
| 5.1 Glove length | See table 2 | Size XXL (11) Length/mm L: 290, R: 294 | ±0.3 mm | PASS |
| 5.1 Comfort and fit | See table 2 | Size XXL (11) Wearer hand size Left: L: 11, C: 8.5 Right: L: 11, C: 8.5 Comments on fit: Thumb slightly long | N/A | PASS |
| 5.2 Dexterity | See table 2 | Size XXL (11) Minimum pin diameter/mm 5.0 | N/A | Level 5 |

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed:
1. An ambidextrous working glove, comprising:
a first interior surface configured to contact a first side of a wearer's hand;
a second interior surface configured to contact a second side of the wearer's hand opposite the first side of the wearer's hand;
a first exterior surface opposite the first interior surface and configured to face away from the wearer's hand;
a second exterior surface opposite the second interior surface and configured to face away from the wearer's hand;
a molded, textured pattern providing:
(1) an external textured gripping pattern on at least a portion of the first exterior surface of the ambidextrous working glove and at least a portion of the second exterior surface of the ambidextrous working glove; and
(2) an internal textured gripping pattern on at least a portion of the first interior surface of the ambidextrous working glove and at least a portion of the second interior surface of the ambidextrous working glove;
wherein:
(a) the external textured gripping pattern being a fish scale textured gripping pattern comprising a series of protruding ridges surrounding depressions, the external textured gripping pattern being present on both the first exterior surface of the ambidextrous working glove and the second exterior surface of the ambidextrous working glove in a palm region, a finger region, and a thumb region, the thumb region facing the fingers; and
(b) the internal textured gripping pattern comprising a series of islands surrounded by channels, constituting the reverse of the external textured gripping pattern, the internal textured gripping pattern being present on both the first interior surface of the ambidextrous working glove and the second interior surface of the ambidextrous working glove in each of the palm region, the finger region, and the thumb region.
2. The ambidextrous working glove of claim 1, wherein the ambidextrous working glove has a thickness in a range between 6 mil and 10 mil, the thickness being measured at a non-textured region between the first interior surface of the ambidextrous working glove and the first exterior surface of the ambidextrous working glove.

3. The ambidextrous working glove of claim 1, wherein a first measured thickness of the ambidextrous working glove measured in a textured area between the first interior surface of the ambidextrous working glove and the first exterior surface of the working glove is greater than a second measured thickness of the ambidextrous working glove measured in a non-textured area between the first interior surface of the ambidextrous working glove and the first exterior surface of the working glove.

4. The ambidextrous working glove of claim 3, wherein the first measured thickness is 50% greater than the second measured thickness.

5. The ambidextrous working glove of claim 1, wherein the ambidextrous working glove complies with at least one requirement selected from the group consisting of Federal Food, Drug, and Cosmetic Act ("FFDCA") requirements for food handling, European Standard EN374-3, European Standard EN388:2003, European Standard EN374-2, European Standard EN420:2003, European Standard ENI 186:2002, and European Standard EN421:2010.

6. The ambidextrous working glove of claim 1, wherein the ambidextrous working glove includes a synthetic rubber.

7. The ambidextrous working glove of claim 6, wherein the synthetic rubber includes acetonitrile and butadiene.

8. The ambidextrous working glove of claim 1, wherein the ambidextrous working glove includes latex.

9. The ambidextrous working glove of claim 1, wherein the ambidextrous working glove includes polyurethane.

10. The ambidextrous working glove of claim 1, further comprising a non-textured portion on the first exterior surface and a non-textured portion on the first interior surface, the non-textured portions being located between each of the four fingers of the ambidextrous working glove and on a thumb facing away from the four fingers.

* * * * *